United States Patent
Komitov et al.

(10) Patent No.: US 7,575,788 B2
(45) Date of Patent: *Aug. 18, 2009

(54) POLYMERS FOR USE AS ALIGNMENT LAYERS IN LIQUID CRYSTAL DEVICES

(75) Inventors: Lachezar Komitov, Göteborg (SE); Bertil Helgee, Västra Frölunda (SE)

(73) Assignee: Ecsibeo PPF2 AB, Göteborg (SE)

( * ) Notice: Subject to any disclaimer, the term of this patent is extended or adjusted under 35 U.S.C. 154(b) by 538 days.

This patent is subject to a terminal disclaimer.

(21) Appl. No.: 10/562,118

(22) PCT Filed: Mar. 4, 2004

(86) PCT No.: PCT/SE2004/000300

§ 371 (c)(1),
(2), (4) Date: Dec. 23, 2005

(87) PCT Pub. No.: WO2004/113470

PCT Pub. Date: Dec. 29, 2004

(65) Prior Publication Data

US 2007/0088125 A1     Apr. 19, 2007

(51) Int. Cl.
*C09K 19/00* (2006.01)
*C09K 19/52* (2006.01)
*C09K 19/06* (2006.01)

(52) U.S. Cl. .................. 428/1.2; 428/1.1; 428/1.3; 252/299.01; 252/299.6; 430/20; 430/270.1; 525/56

(58) Field of Classification Search ............ 252/299.01, 252/299.6; 428/1.1–1.3; 430/20, 270.1; 525/56

See application file for complete search history.

(56) References Cited

U.S. PATENT DOCUMENTS

| | | | |
|---|---|---|---|
| 4,433,900 | A | 2/1984 | Sekimura |
| 4,668,051 | A | 5/1987 | Mourey et al. |
| 5,236,999 | A | 8/1993 | Kroggel |
| 5,578,243 | A | 11/1996 | Mazaki et al. |
| 5,973,817 | A | 10/1999 | Robinson et al. |
| 6,010,641 | A | 1/2000 | Sage et al. |
| 6,048,928 | A | 4/2000 | Yu et al. |
| 6,985,200 | B2 | 1/2006 | Miyachi et al. |
| 2001/0006407 | A1 | 7/2001 | Choi et al. |
| 2001/0006480 | A1 | 7/2001 | Sato |
| 2003/0203130 | A1 | 10/2003 | Geiso et al. |
| 2007/0098918 | A1* | 5/2007 | Komitov et al. ............. 428/1.1 |

FOREIGN PATENT DOCUMENTS

| | | |
|---|---|---|
| CN | 1465653 | 1/2004 |
| EP | 0 575 986 A2 | 12/1993 |
| EP | 0 905 167 A1 | 3/1999 |
| EP | 1 037 092 A1 | 9/2000 |
| EP | 1 142 977 A1 | 10/2001 |
| EP | 1 375 562 A1 | 12/2001 |
| EP | 1 209 185 A1 | 5/2002 |
| EP | 1 310 541 A2 | 5/2003 |
| EP | 1 359 181 A1 | 11/2003 |
| GB | 2 326 245 A | 12/1998 |
| JP | 2003-315825 A | 11/2003 |
| WO | 01/23953 A1 | 4/2001 |
| WO | 02/44801 A2 | 6/2002 |

OTHER PUBLICATIONS

China Official Action dated Aug. 3, 2007.
Coles et al., The effect of the molecular structure on flexoelectric coupling in the chiral nematic phase, Journal of Material Science (Chemistry), vol. 11, pp. 2709-2716, Feb. 2001.
Jones et al., Director Structures in Achiral Smectic C Liquid Crystal Cells: Field Induced Twist Domain Nucleation, Electronic Liquid Crystal Communications, Feb. 2005.
Rudquist et al., Linear electro-optic effect in a cholesteric liquid crystal, Physical Review E, vol. 50, No. 6, pp. 4735-4743, Dec. 1994.

* cited by examiner

*Primary Examiner*—Geraldina Visconti
(74) *Attorney, Agent, or Firm*—Buchanan Ingersoll & Rooney PC

(57) ABSTRACT

The invention relates to a polymer for use as a surface-director alignment layer in a liquid crystal device, the polymer comprising a polymeric backbone and side-chains attached thereto, wherein the polymeric backbone lacks directly coupled ring structures, and each side-chain of at least some of the side-chains comprises at least two unsubstituted and/or substituted phenyls coupled via a coupling selected from the group consisting of a carbon-carbon single bond (—), a carbon-carbon double bond containing unit (—CH=CH—), a carbon-carbon triple bond containing unit (—C≡C—), a methylene ether unit (—CH$_2$O—), an ethylene ether unit (—CH$_2$CH$_2$O—), an ester unit (—COO—) and an azo unit (—N=N—), exhibits a permanent and/or induced dipole moment that in ordered phase provides dielectric anisotropy, and is attached to the polymeric backbone via at least two spacing atoms.

24 Claims, 4 Drawing Sheets

POLYMERS FOR USE AS ALIGNMENT LAYERS IN LIQUID CRYSTAL DEVICES

TECHNICAL FIELD

The present invention generally relates to the field of liquid crystals. More specifically, the present invention relates to a polymer for use as a surface-director alignment layer in a liquid crystal device (LCD).

The invention also relates to a method for preparation of said polymer, a composition comprising said polymer, a surface-director alignment layer comprising said polymer, the use of said polymer as a surface-director alignment layer, and a method for manufacturing a liquid crystal device.

TECHNICAL BACKGROUND

One of the basic operational principle of liquid crystal displays and devices is the switching of the orientation of the liquid crystal molecules by an applied electric field that couples to the dielectric anisotropy of the liquid crystal material (dielectric coupling). Such a coupling gives rise to an electro-optic response quadratic with the applied electric field, i.e. independent of the field polarity.

The dielectric anisotropy ($\Delta\in$) of a material having an ordered molecular structure (ordered phase) possessing a structural anisotropy, such as a crystalline or a liquid crystalline structure, is the difference between the dielectric constants measured in perpendicular and parallel direction, respectively, to the preferred molecular orientation in this material.

When an electric field is applied across a liquid crystal material exhibiting a positive dielectric anisotropy ($\Delta\in>0$), the molecules will align their long axis along (or substantially along) the direction of the electric field.

When an electric field is applied across a liquid crystal material exhibiting a negative dielectric anisotropy ($\Delta\in<0$), the molecules will align their long axis perpendicular (or substantially perpendicular) to the direction of the electric field.

Liquid crystal molecules are long rod-like molecules (so-called calamitic molecules) which have the ability to align along their long axis in a certain preferred direction (orientation). The average direction of the molecules is specified by a vector quantity and is called director.

In liquid crystal displays, the desired initial alignment of the liquid crystal layer in the absence of an external field, such as an electric field, is generally achieved by appropriate surface treatment of the confining solid substrate surfaces, such as by applying a so-called (surface-director) alignment layer (orientation layer) on the confining substrate surfaces facing said liquid crystal bulk. The initial liquid crystal alignment is defined by solid surface/liquid crystal interactions. The orientation of the liquid crystal molecules adjacent to the confining surface is transferred to the liquid crystal molecules in the bulk via elastic forces, thus imposing essentially the same alignment to all liquid crystal bulk molecules.

The director of the liquid crystal molecules near the confining substrate surfaces (herein also called surface director) is constrained to point in a certain direction, such as perpendicular to (also referred to as homeotropic or vertical) or in parallel with (also referred to as planar) the confining substrate surfaces. The type of alignment in liquid crystal displays operating on the coupling between liquid crystal dielectric anisotropy and applied electric field is chosen in accordance with the sign of the dielectric anisotropy, the direction of the applied electric field and the desired type of switching mode (in-plane or out-of-plane).

In out-of-plane switching liquid crystal cells employing a liquid crystal bulk having a negative dielectric anisotropy, it is important to uniformly orient the director of the liquid crystal bulk molecules (in the field-off state) vertically to the substrate surfaces (so-called homeotropic alignment).

An example of a method for establishing a homeotropic alignment comprises coating the confining substrate surfaces with a surfactant, such as lecithin or hexadecyltrimethyl ammonium bromide. The coated substrate surfaces is then also preferably rubbed in a predetermined direction, so that the field-induced planar alignment of the liquid crystal molecules will be oriented in the predetermined rubbing direction. This method may give good results in laboratory studies, but has never found industrial acceptance due to that long term stability is not obtained as the alignment layer is slowly dissolved in the bulk liquid crystal (J. Cognard, Mol. Cryst. Liq. Cryst., Suppl. Ser., 1982, 1, 1).

In out-of-plane switching liquid crystal cells employing a liquid crystal bulk having a positive dielectric anisotropy and in in-plane switching liquid crystal cells employing a liquid crystal bulk having a positive or negative dielectric anisotropy, it is important to uniformly orient the director of the liquid crystal bulk molecules (in the field-off state) in parallel with the substrate surfaces (so-called planar alignment). For twisted nematic liquid crystal cells, it is also important to orient the liquid crystal bulk molecules at a certain inclined orientation angle (pre-tilt angle) to the substrate.

Known methods for establishing planar alignment are, for instance, the inorganic film vapour deposition method and the organic film rubbing method.

In the inorganic film vapour deposition method, an inorganic film is formed on a substrate surface by vapour-deposition of an inorganic substance, such as silicon oxide, obliquely to the confining substrate so that the liquid crystal molecules are oriented by the inorganic film in a certain direction depending on the inorganic material and evaporation conditions. Since the production cost is high, and the method thus is not suitable for large-scale production, this method is practically not used.

According to the organic film rubbing method, an organic coating of, for instance, polyvinyl alcohol, polyoxyethylene, polyamide or polyimide, is formed on a substrate surface. The organic coating is thereafter rubbed in a predetermined direction using a cloth of e.g. cotton, nylon or polyester, so that the liquid crystal molecules in contact with the layer will be oriented in the rubbing direction.

Polyvinyl alcohols (PVA) are commercially rarely used as alignment layers since these polymers are hydrophilic, hygroscopic polymers that may adsorb moisture adversely affecting the molecular orientation of the polymer and thus the liquid crystal device performance. In addition, PVA may attract ions which also impairs the liquid crystal device performance.

Also polyoxyethylenes may attract ions, thus resulting in impaired liquid crystal device performance.

Polyamides have a low solubility in most commonly accepted solvents. Therefore, polyamides are seldom used commercially in liquid crystal device manufacturing.

Polyimides are in most cases used as organic surface coating due to their comparatively advantageous characteristics, such as chemical stability, thermal stability, etc. The application of a polyimide layer generally includes a baking step at 200-300° C. as described below.

Polyimides may be prepared according to, for instance, Scheme I or Scheme II below:

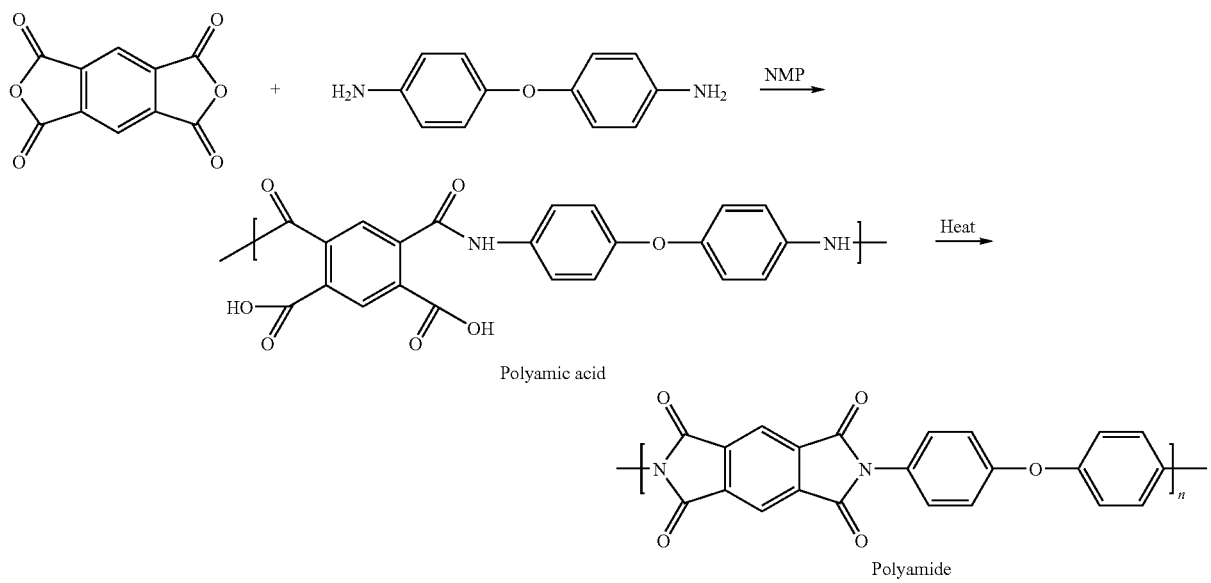

Scheme I

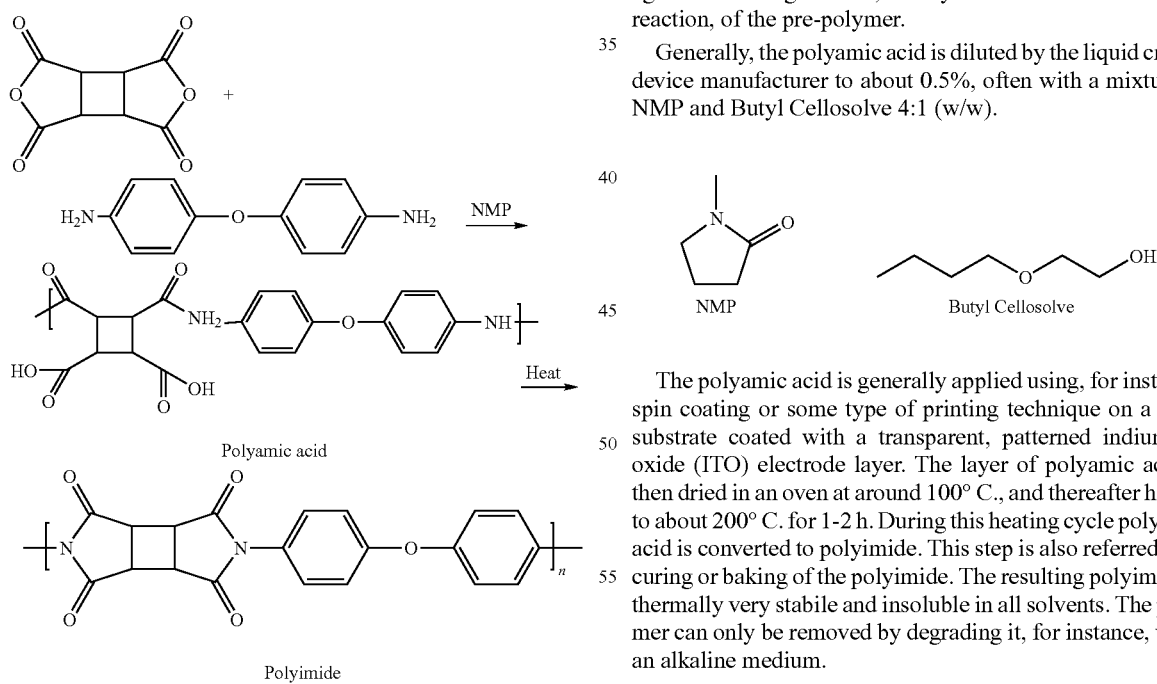

Scheme II

In the first step, equimolar amounts of a tetracarboxylic acid anhydride and a diamine are mixed in an amide solvent, such as N-methylpyrrolidone (NMP). A spontaneous reaction occurs and a polyamic acid, which is a pre-polymer of polyimide, is formed. In this state, the pre-polymer is distributed to its users, such as LCD manufacturers. However, since the pre-polymer solution is rather unstable at room temperature, the solution is generally cooled upon transportation and storage to avoid degradation, or any other unwanted chemical reaction, of the pre-polymer.

Generally, the polyamic acid is diluted by the liquid crystal device manufacturer to about 0.5%, often with a mixture of NMP and Butyl Cellosolve 4:1 (w/w).

The polyamic acid is generally applied using, for instance, spin coating or some type of printing technique on a glass substrate coated with a transparent, patterned indium tin oxide (ITO) electrode layer. The layer of polyamic acid is then dried in an oven at around 100° C., and thereafter heated to about 200° C. for 1-2 h. During this heating cycle polyamic acid is converted to polyimide. This step is also referred to as curing or baking of the polyimide. The resulting polyimide is thermally very stabile and insoluble in all solvents. The polymer can only be removed by degrading it, for instance, using an alkaline medium.

A drawback of this organic film application process is the baking step, resulting in both a long production time and high production costs.

Furthermore, high temperatures, such as about 200° C., should be avoided in the manufacturing of, for instance, liquid-crystal-on-silicon (LCOS) and thin film transistors (TFT) since high temperatures may result in decreased yields and thus film defects.

It is also difficult to control the anchoring strength between the organic film applied using said organic film application process and a liquid crystal bulk layer.

It would be a great advantage if said baking step could be eliminated and the above disadvantages avoided.

SUMMARY OF THE INVENTION

An object of the present invention is to avoid the abovementioned drawbacks of known surface-director alignment materials and to provide improved materials for use as surface-director alignment layers in liquid crystal devices, such as liquid crystal display devices and other liquid crystal devices.

According to a first aspect of the invention, this and other objects are achieved with a polymer comprising a polymeric backbone and side-chains attached thereto, wherein the polymeric backbone lacks directly coupled ring structures, and each side-chain of at least some of the side-chains comprises at least two unsubstituted and/or substituted phenyls coupled via a coupling selected from the group consisting of a carbon-carbon single bond (—), a carbon-carbon double bond containing unit (—CH=CH—), a carbon-carbon triple bond containing unit (—C≡C—), a methylene ester unit (—CH$_2$O—), an ethylene ester unit (—CH$_2$CH$_2$O—), an ester unit (—COO—) and an azo unit (—N=N—), exhibits a permanent and/or induced dipole moment that in ordered phase provides dielectric anisotropy, and is attached to the polymeric backbone via at least two spacing atoms, preferably at least five spacing atoms.

The polymeric backbone is preferably a polyvinyl acetal.

An advantage with this type of polymers is that they are soluble in organic solvents, such as chloroform, tetrahydrofuran, mixtures of xylene and butyl acetate, dimethylacetamide, dimethylformamide, and N-methylpyrrolidone. Since the polymers according to the present invention are soluble in organic solvents, a solution of the polymer per se (and not a solution of a pre-polymer thereof) may be applied on a substrate surface for use as a surface-director alignment layer in a liquid crystal device without the need of a curing step which, as disclosed in the Technical Background, is used in processes involving prior art alignment materials, such as polyimides. Thus, the step in which a pre-polymer is heated for about 1-2 h at about 180-250° C. is avoided. The avoidance of the curing step decreases the production cycle times for liquid crystal devices, thus saving time, energy and money. Up to about 20% shorter production times, in comparison to conventional production processes, may be achieved using the polymers according to the present invention.

In addition, the tough heating during curing of prior art alignment materials may cause defects and reduce yield. These disadvantages are also avoided using the polymers according to the invention and the yield may be substantially increased.

Furthermore, no advanced oven equipment is required and thus investment costs can be reduced for a production line using the polymers according to the invention.

Another advantage of the polymers according to the present invention is that the polymers may be applied not only on glass substrates but also on plastic substrates, which cannot be used if a heating (curing) step is employed. Application on plastic substrates enables the use of a variety of substrate forms, such as curved substrate surfaces and rolled-up substrate surfaces.

Still another advantage of the polymers according to the present invention is that said solutions of the polymers in organic solvents are stable at room temperature, i.e. the dissolved polymers will not degrade upon storage at room temperature. Thus, there is no need to cool the solutions, which is often required for the pre-polymer solutions used according to prior art.

Yet another advantage of the polymers according to the present invention is that the polymers provide an improved control of the anchoring strength between an alignment layer of a polymer according to the invention and a liquid crystal bulk layer, and hence an improved control of the response time, i.e. the rise and decay times (a strong anchoring strength provides a short decay time and a weak anchoring strength provides a short rise time).

It shall be noted that the polymers according to the invention can be used in existing manufacturing procedures for liquid crystal devices utilising existing process equipment.

According to a second aspect of the invention, there is provided a method for preparation of a polymer according to the invention comprising reacting a side-chain precursor with a polymeric backbone lacking directly coupled ring structures wherein said side-chain precursor comprises at least two unsubstituted and/or substituted phenyls coupled via a coupling selected from the group consisting of a carbon-carbon single bond (—), a carbon-carbon double bond containing unit (—CH=CH—), a carbon-carbon triple bond containing unit. (—C≡C—), a methylene ester unit (—CH$_2$O—), an ethylene ester unit (—CH$_2$CH$_2$O—), an ester unit (—COO—) and an azo unit (—N=N—), and exhibits a permanent and/or induced dipole moment that in ordered phase provides dielectric anisotropy.

According to a third aspect of the invention, there is provided a method for preparation of a polymer according to the invention comprising polymerising monomers having sidechains into a polymeric backbone lacking directly coupled ring structures, wherein each side-chain of at least some of the side-chains comprises at least two unsubstituted and/or substituted phenyls coupled via a coupling selected from the group consisting of a carbon-carbon single bond (—), a carbon-carbon double bond containing unit (—CH=CH—), a carbon-carbon triple bond containing unit (—C≡C—), a methylene ester unit (—CH$_2$O—), an ethylene ester unit (—CH$_2$CH$_2$O—), an ester unit (—COO—) and an azo unit (—N=N—), and exhibits a permanent and/or induced dipole moment that in ordered phase provides dielectric anisotropy.

According to a fourth aspect of the invention, there is provided a composition for use as a surface-director alignment layer in a liquid crystal device, said composition comprising at least one polymer according to the invention.

According to a fifth aspect of the invention, there is provided a surface-director alignment layer for use in a liquid crystal device, said layer comprising at least one polymer according to the invention.

According to a sixth aspect of the invention, there is provided the use of a polymer according to the invention as a surface-director alignment layer in a liquid crystal device.

According to a seventh aspect of the invention, there is provided a method for manufacturing a liquid crystal device, said method comprising the steps of:

providing a surface-director alignment layer comprising a polymer according to the invention on a surface of at least one substrate, and sandwiching a liquid crystal layer between two substrates, at least one of which is provided with said polymer, arranged so that said surface-director alignment layer(s) is (are) facing the liquid crystal layer.

Other features and advantages of the present invention will become apparent from the following description of the invention.

DETAILED DESCRIPTION OF THE INVENTION

Figure 1:
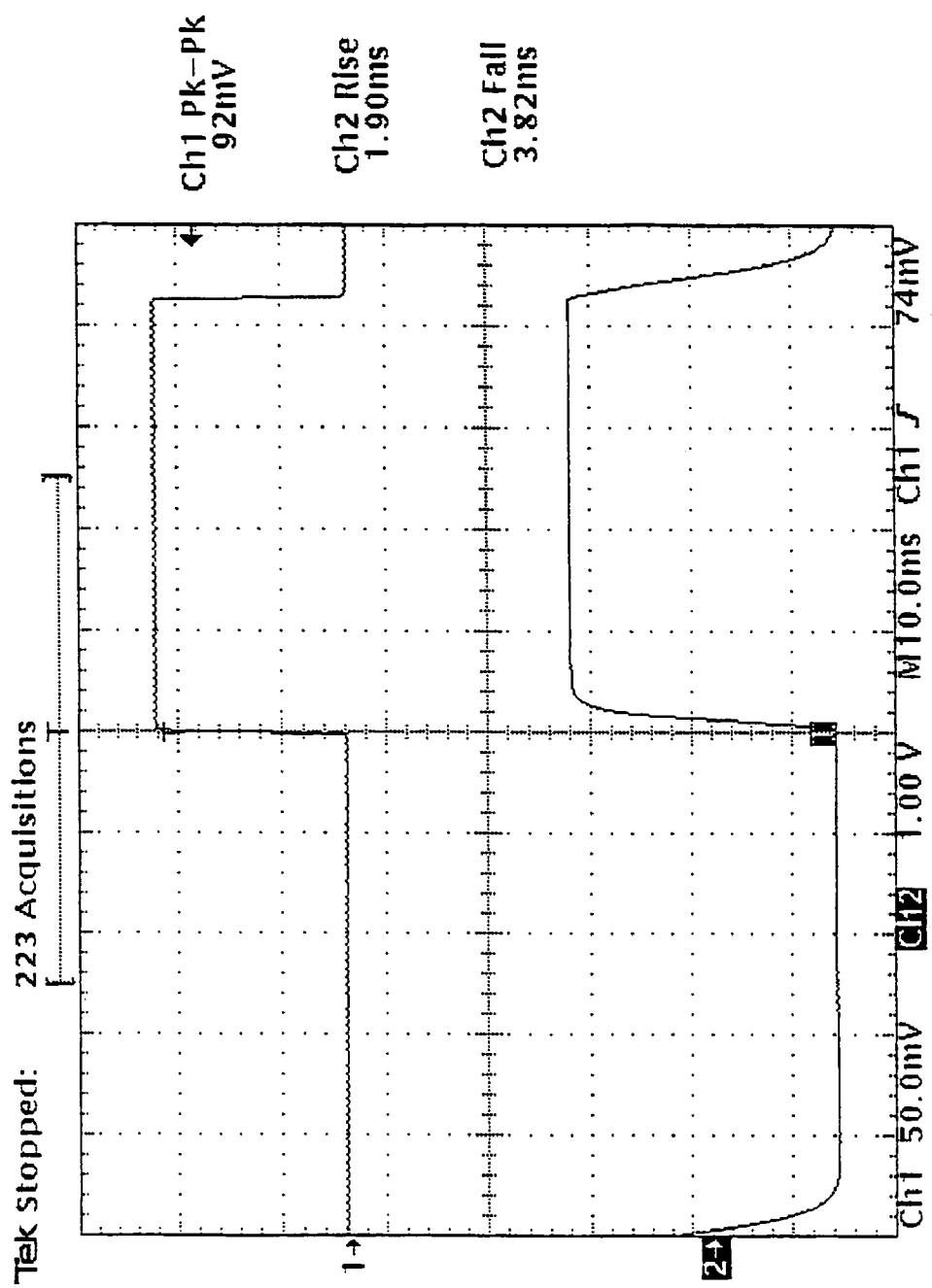
FIG. 1 shows the rise and decay times measured for a liquid crystal device comprising a surface-director alignment layer according to the invention and exhibiting an initial vertical alignment of the liquid crystal bulk layer (see Example 17).

The co-pending Swedish applications 0301810-8 and 0303041-8, incorporated herein by reference and from which priority is claimed, describe a liquid crystal device comprising a liquid crystal bulk layer presenting a surface director at a bulk surface thereof, and a surface-director alignment layer arranged to interact with the bulk layer at said bulk surface for facilitating the obtaining of a preferred orientation of the surface director of the bulk layer, wherein the liquid crystal bulk layer and the surface-director alignment layer each are directly controllable by an electric field via dielectric coupling. Depending on the type of display and the desired effect, the surface-director alignment layer may exhibit a positive or a negative dielectric anisotropy, or the layer may comprise structural parts exhibiting dielectric anisotropies ($\Delta\epsilon$) of opposite signs.

In these applications some of the following polymers, comprising a polymeric backbone (Z) and one or more side-chains attached thereto, are given as examples of suitable surface-director alignment materials.

The following abbreviations are used in the formulas of this application:

R1 and R2 are each independently an aliphatic hydrocarbon chain, such as an alkyl, preferably comprising 1 to 20 carbon atoms, such as 2 to 12 carbon atoms, R3 (represents spacing atoms) is a an aliphatic hydrocarbon, such as an alkyl, a siloxane, an ethylene glycol chain, or any combination thereof, comprising at least 2, preferably 2 to 20, such as 4 to 20, more preferably 5 to 20, carbon atoms or heteroatoms (it shall be noted that the number of carbon atoms or heteroatoms may be randomly varied along the polymer main chain), R4 is an aliphatic hydrocarbon chain, such as an alkyl, preferably comprising 1 to 20 carbon atoms, such as 1 to 5 carbon atoms, R5 and R6 are each independently an aliphatic hydrocarbon, a siloxane, an ethylene glycol chain, or any combination thereof, preferably comprising 4 to 22, such as 6 to 20, more preferably 8 to 18, such as 9 to 15, carbon atoms or heteroatoms, X and Y are each independently H, F, Cl, CN, or $CF_3$, $X_1$ and $Y_1$ are each independently F or Cl, preferably F, and Z is part of a polymer main chain lacking directly coupled ring structures, preferably a polyvinyl acetal according to

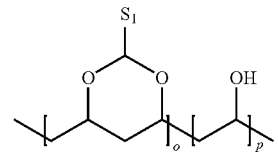

Formulas I-X are examples of polymers, according the invention, comprising side-chains ($S_1$) exhibiting permanent and/or induced dipole moments that in ordered phase provides positive dielectric anisotropy. These polymers are suitable for providing an initial field-off vertical alignment in, for instance, an out-of-plane switching liquid crystal device.

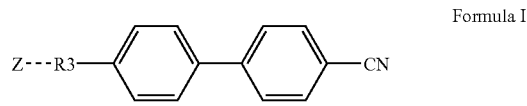

Formula I

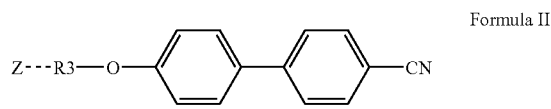

Formula II

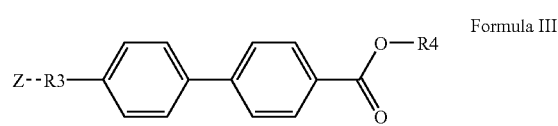

Formula III

Formula IV

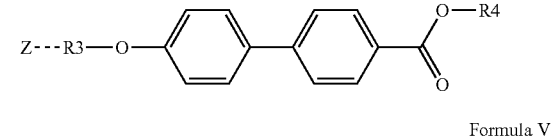

Formula V

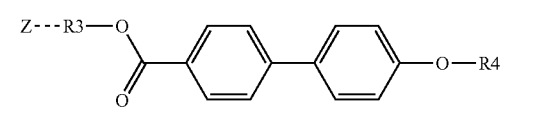

Formula VI

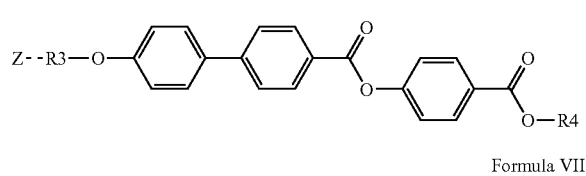

Formula VII

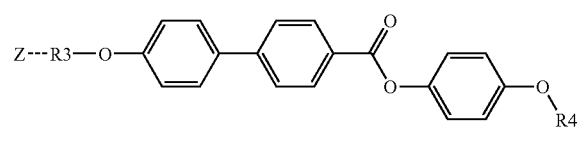

Formula VIII

Formula IX

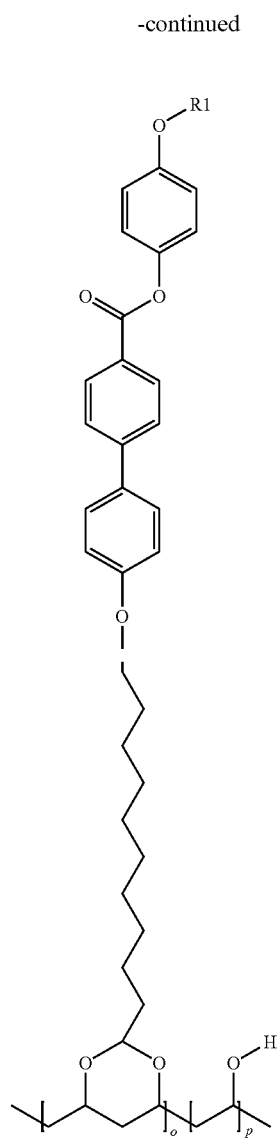

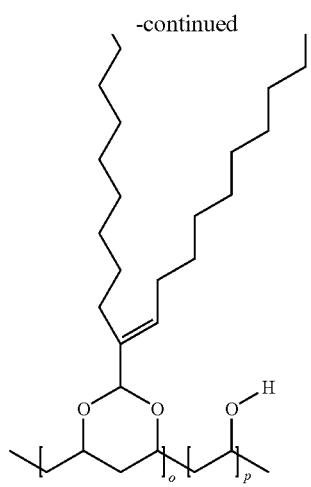

Formulas XI-XIII are examples of polymers, according to the invention, comprising side-chains ($S_1$) exhibiting permanent and/or induced dipole moments that in ordered phase provides positive dielectric anisotropy and side-chains ($S_3$) exhibiting no permanent and/or induced dipole moments and thus providing no dielectric anisotropy. These polymers are suitable for providing an initial field-off vertical alignment in, for instance, an out-of-plane switching liquid crystal device.

Formula X

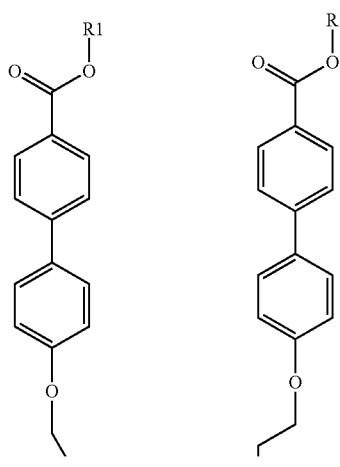

Formula XI

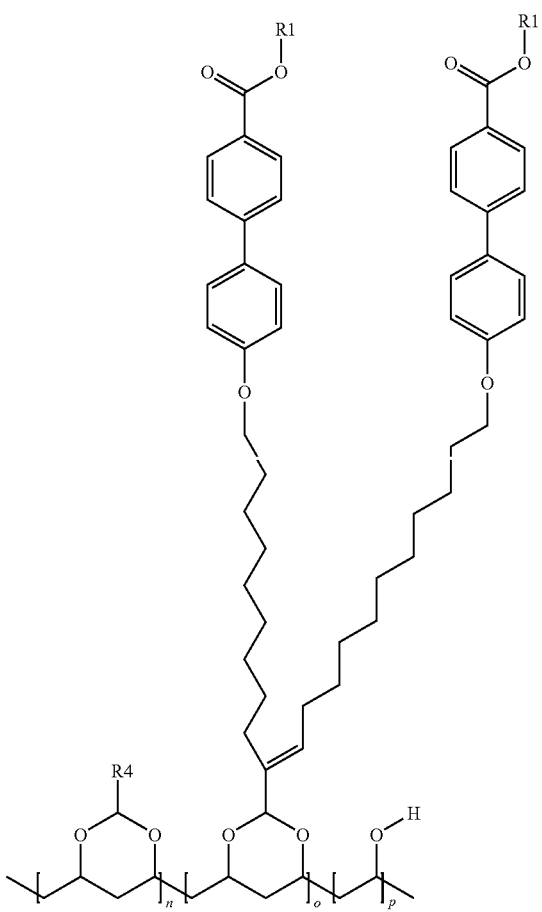

Formula XII
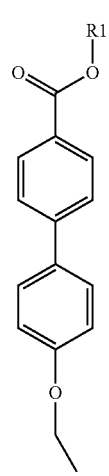
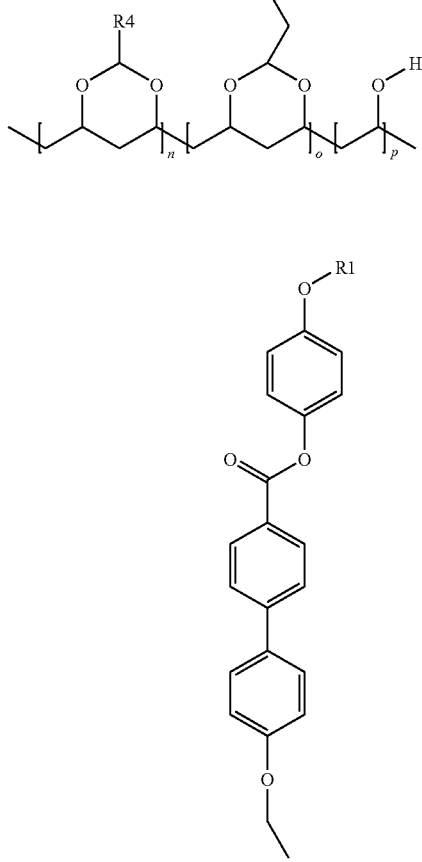
Formula XIII
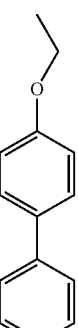
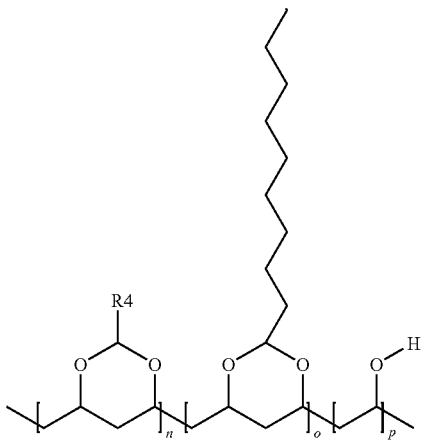
Specific examples of this type of polymers according to the invention are given by Formula XIV to XIX:
Formula XIV
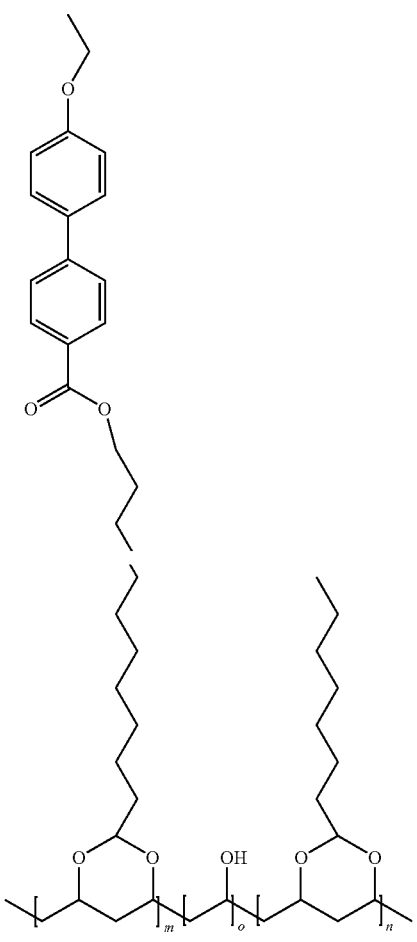

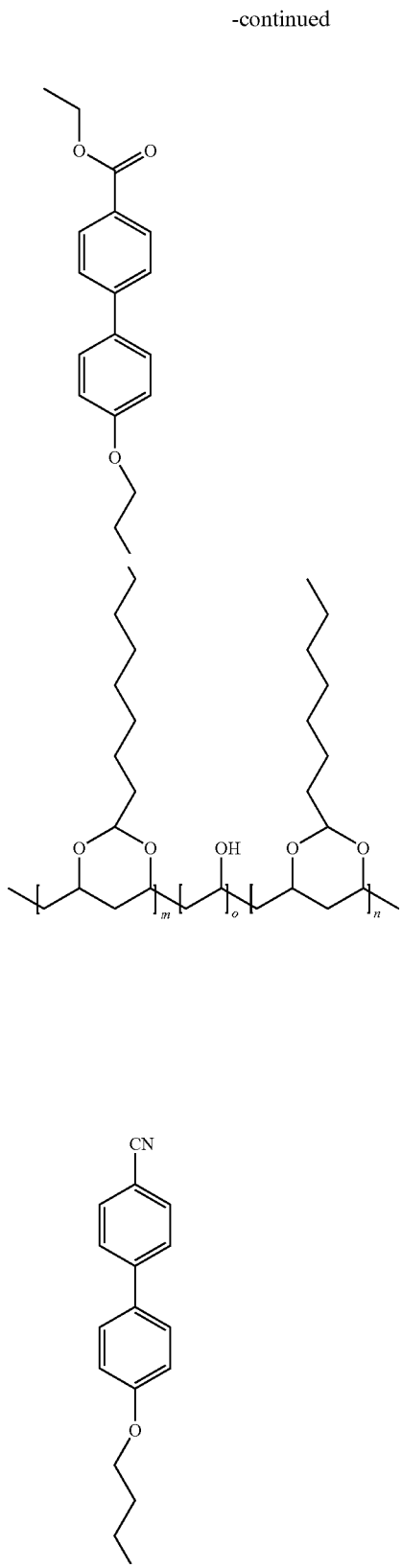
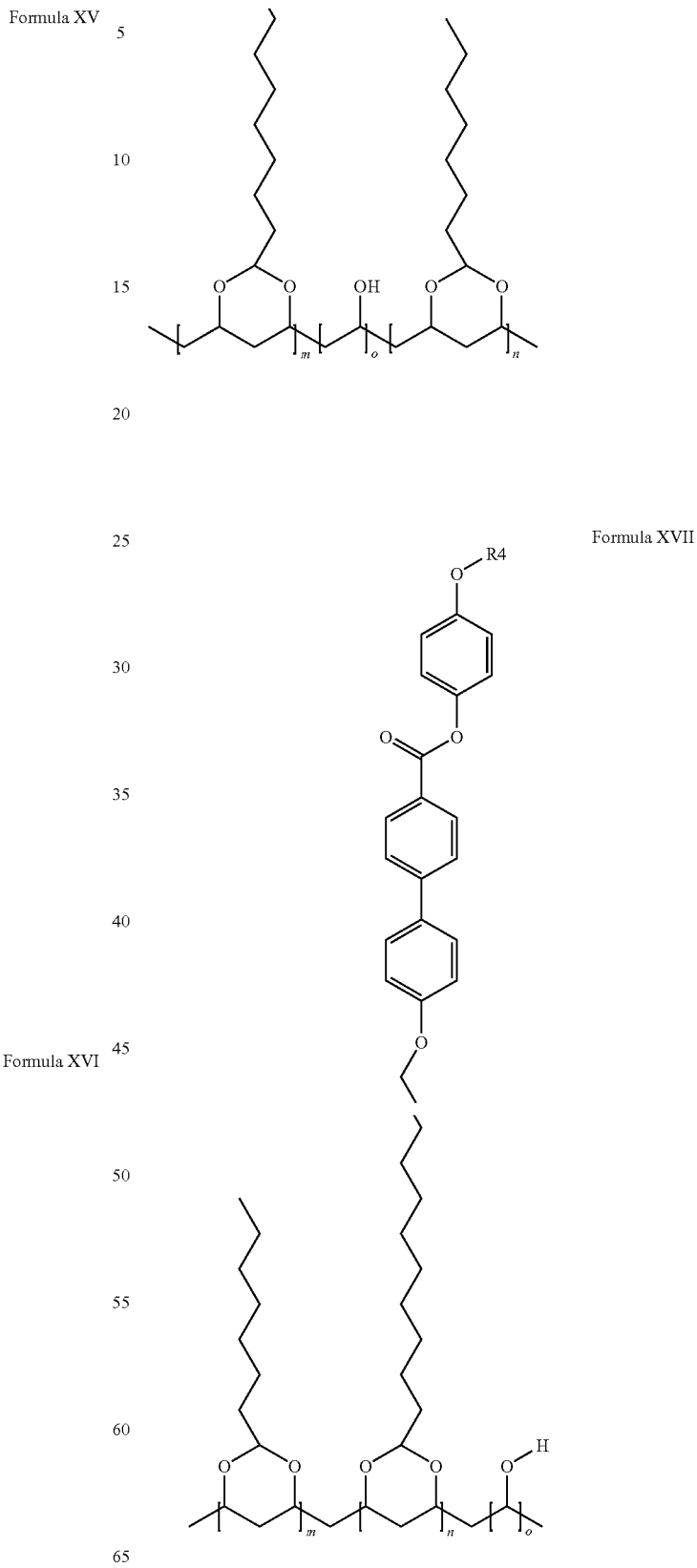
Formula XV
Formula XVI
Formula XVII

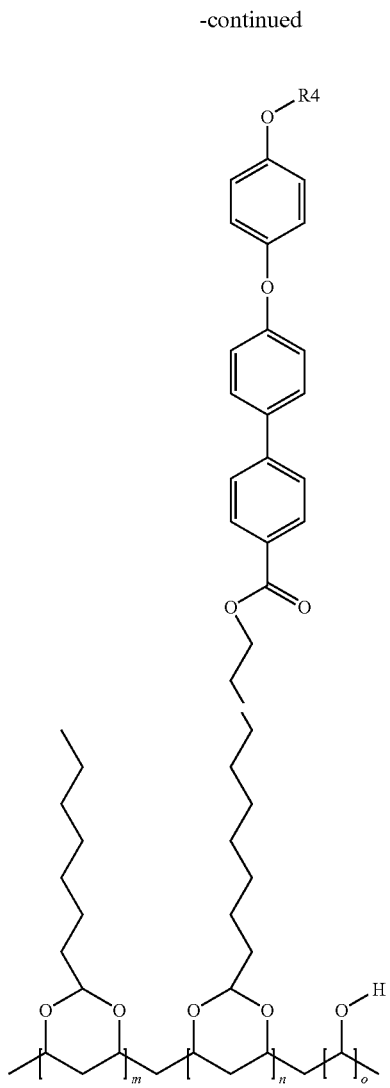

Formula XVIII

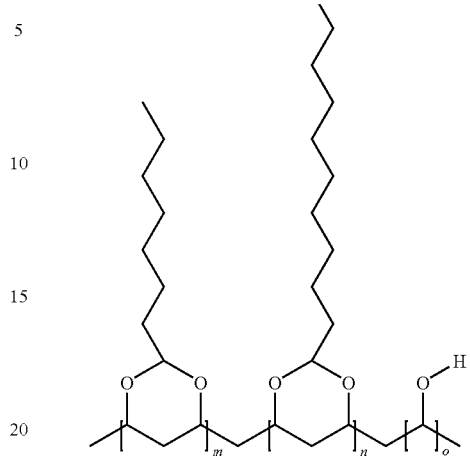

wherein R4 is CH$_3$ and (m+n)/o is within the range of from 25/50 to 43/14, preferably above 40/20, such as 42/16, and m/n is within the range of from 9/1 to 1/9, preferably 3/1 to 1/3, such as 2/1.

Formula XX represents examples of polymers, according to the invention, comprising two different types of side-chains (S$_1$ and S$_2$) exhibiting permanent and/or induced dipole moments that in ordered phase provides positive dielectric anisotropy and side-chains (S$_3$) exhibiting no permanent and/or induced dipole moments and thus providing no dielectric anisotropy. These polymers are suitable for providing an initial field-off vertical alignment in, for instance, an out-of-plane switching liquid crystal device.

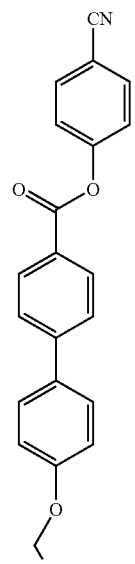

Formula XIX

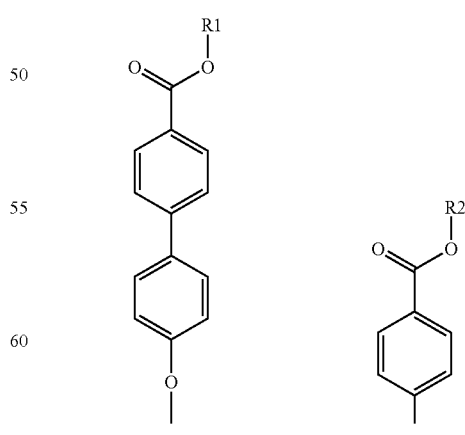

Formula XX

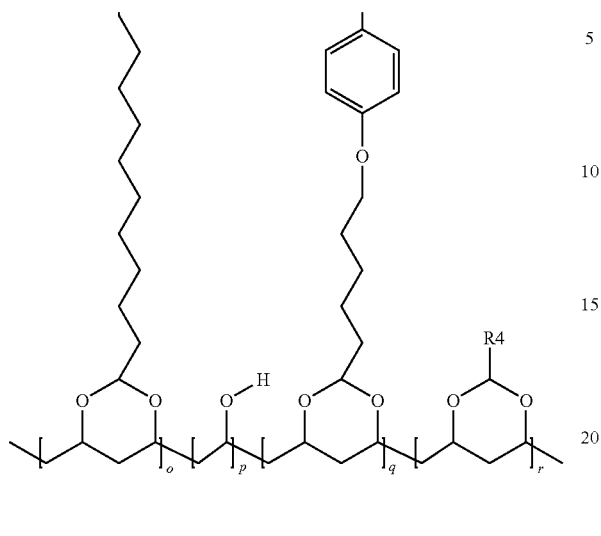

Specific examples of this type of polymers according to the invention are given by Formulas XXI to XXII:

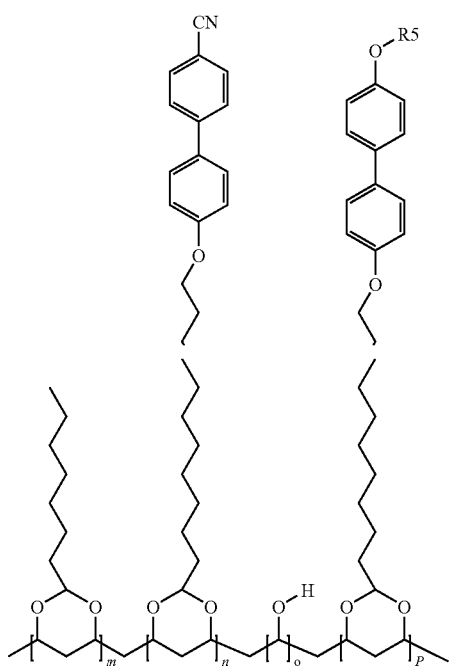

Formula XXI

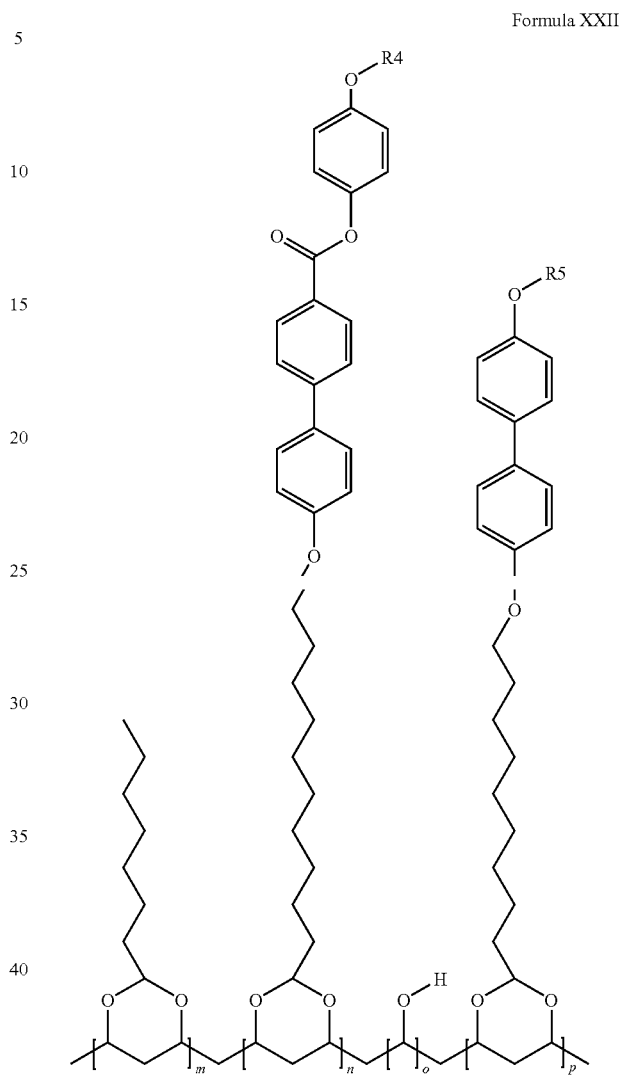

Formula XXII wherein R4 is $CH_3$, R5 is $CH_3$, and (m+n)/o is within the range of from 25/50 to 43/14, preferably above 40/20, such as 42/16, and m/n is within the range of from 9/1 to 1/9, preferably 3/1 to 1/3, such as 2/1.

Formulas XXIII to XXXIII are examples of polymers, according to the invention, comprising side-chains ($S_1$) exhibiting permanent and/or induced dipole moments that in ordered phase provides negative dielectric anisotropy. These polymers are suitable for providing an initial field-off planar alignment in, for instance, an out-of-plane or an in-plane switching liquid crystal device.

Formula XXIII
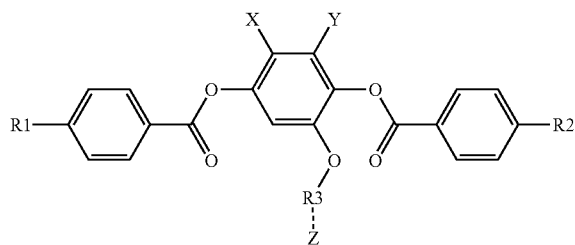

Formula XXIV
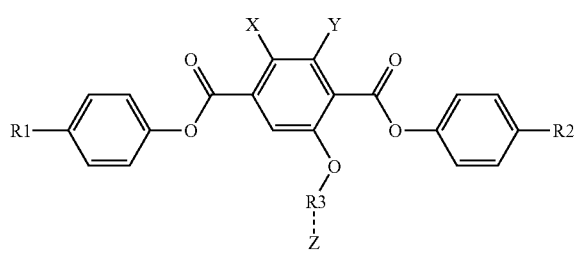

Formula XXV
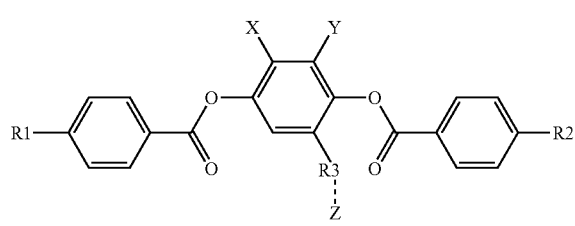

Formula XXVI
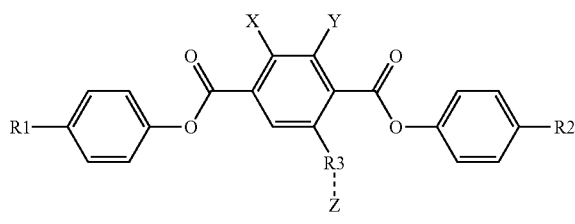

Formula XXVII
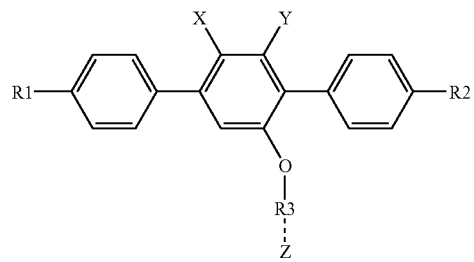

Formula XXVIII
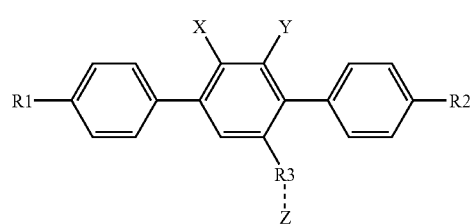

Formula XXIX
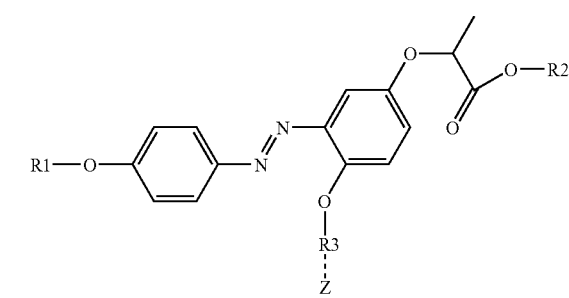

Formula XXX
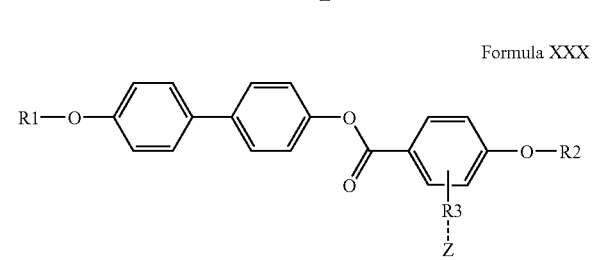

Formula XXXI
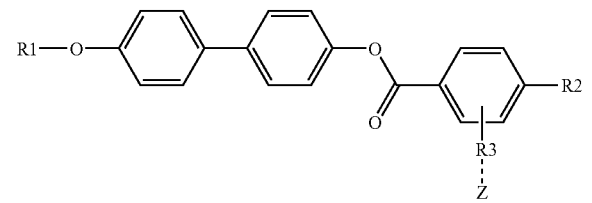

Formula XXXII
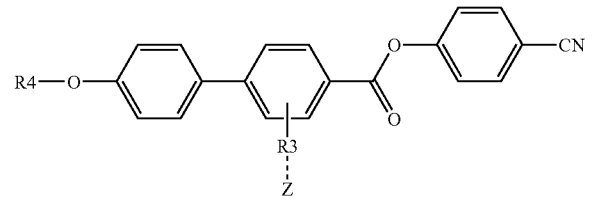

Formula XXXIII
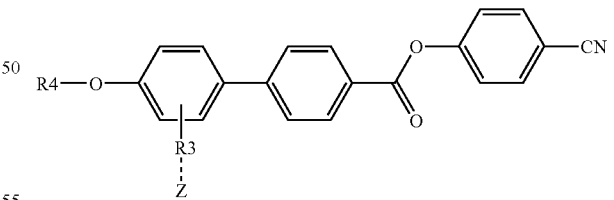

A specific example of a polymer, according to the invention, comprising side-chains ($S_1$) exhibiting permanent and/or induced dipole moments that in ordered phase provides negative dielectric anisotropy and side-chains ($S_3$) exhibiting no permanent and/or induced dipole moments and thus providing no dielectric anisotropy is given by Formula XXXIV. This polymer is suitable for providing an initial field-off planar alignment in, for instance, an out-of-plane or an in-plane switching liquid crystal device.

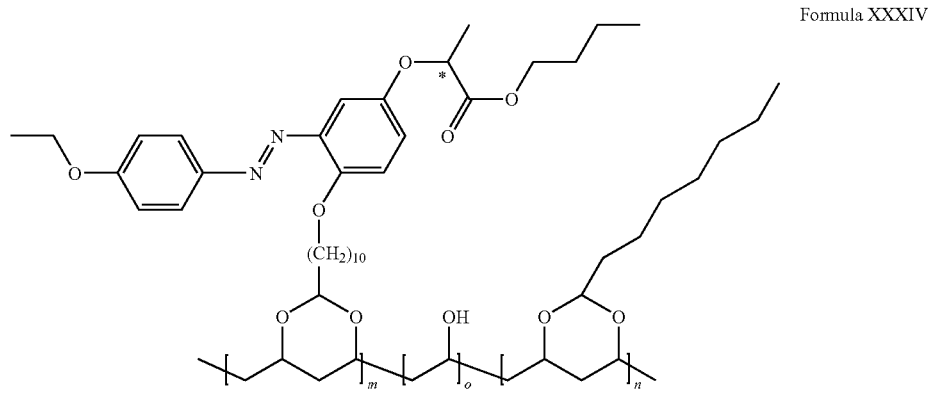

Formula XXXIV wherein (m+n)/o is within the range of from 25/50 to 43/14, preferably above 40/20, such as 43/18, and m/n is within the range of from 9/1 to 1/9, preferably 3/1 to 1/3, such as 1/1.

Formulas XXXV to LI are examples of polymers, according to the invention, comprising side-chains ($S_1$) exhibiting permanent and/or induced dipole moments that in ordered phase provides positive dielectric anisotropy. These polymers are suitable for providing an initial field-off planar alignment in, for instance, an in-plane switching liquid crystal device.

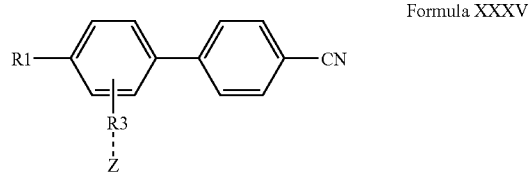

Formula XXXV

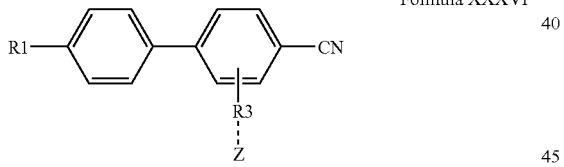

Formula XXXVI

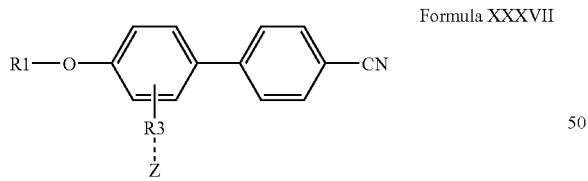

Formula XXXVII

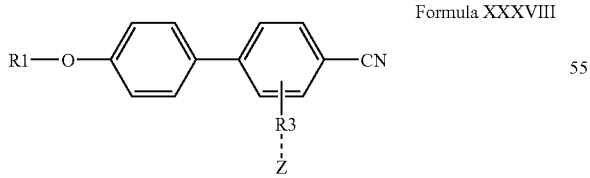

Formula XXXVIII

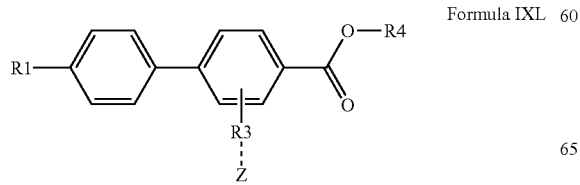

Formula IXL

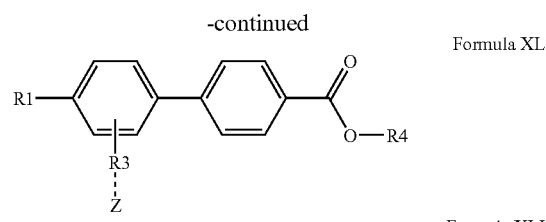

Formula XL

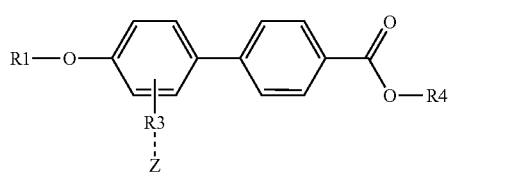

Formula XLI

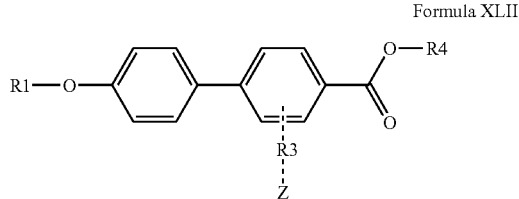

Formula XLII

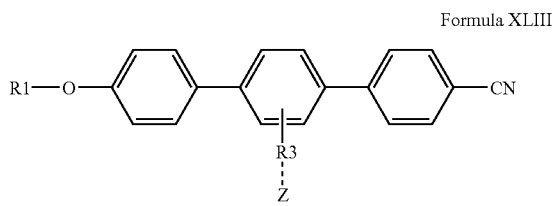

Formula XLIII

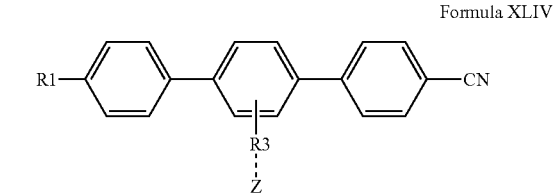

Formula XLIV

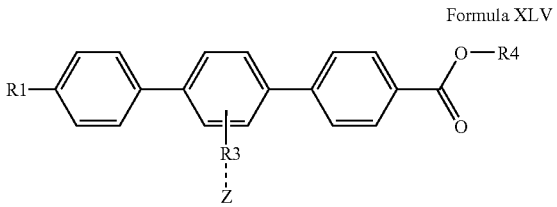

Formula XLV

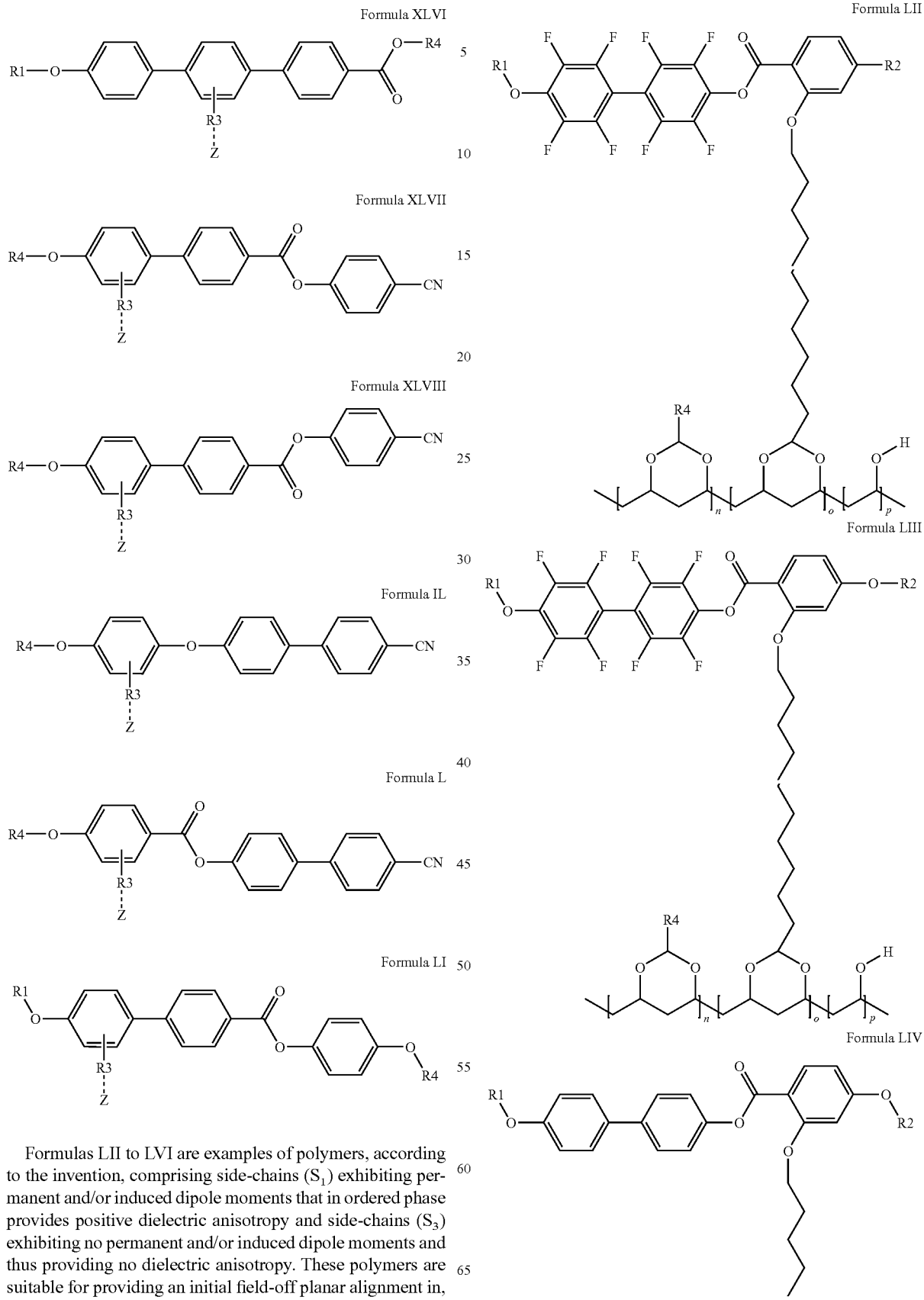

Formulas LII to LVI are examples of polymers, according to the invention, comprising side-chains (S₁) exhibiting permanent and/or induced dipole moments that in ordered phase provides positive dielectric anisotropy and side-chains (S₃) exhibiting no permanent and/or induced dipole moments and thus providing no dielectric anisotropy. These polymers are suitable for providing an initial field-off planar alignment in, for instance, an in-plane switching liquid crystal device.

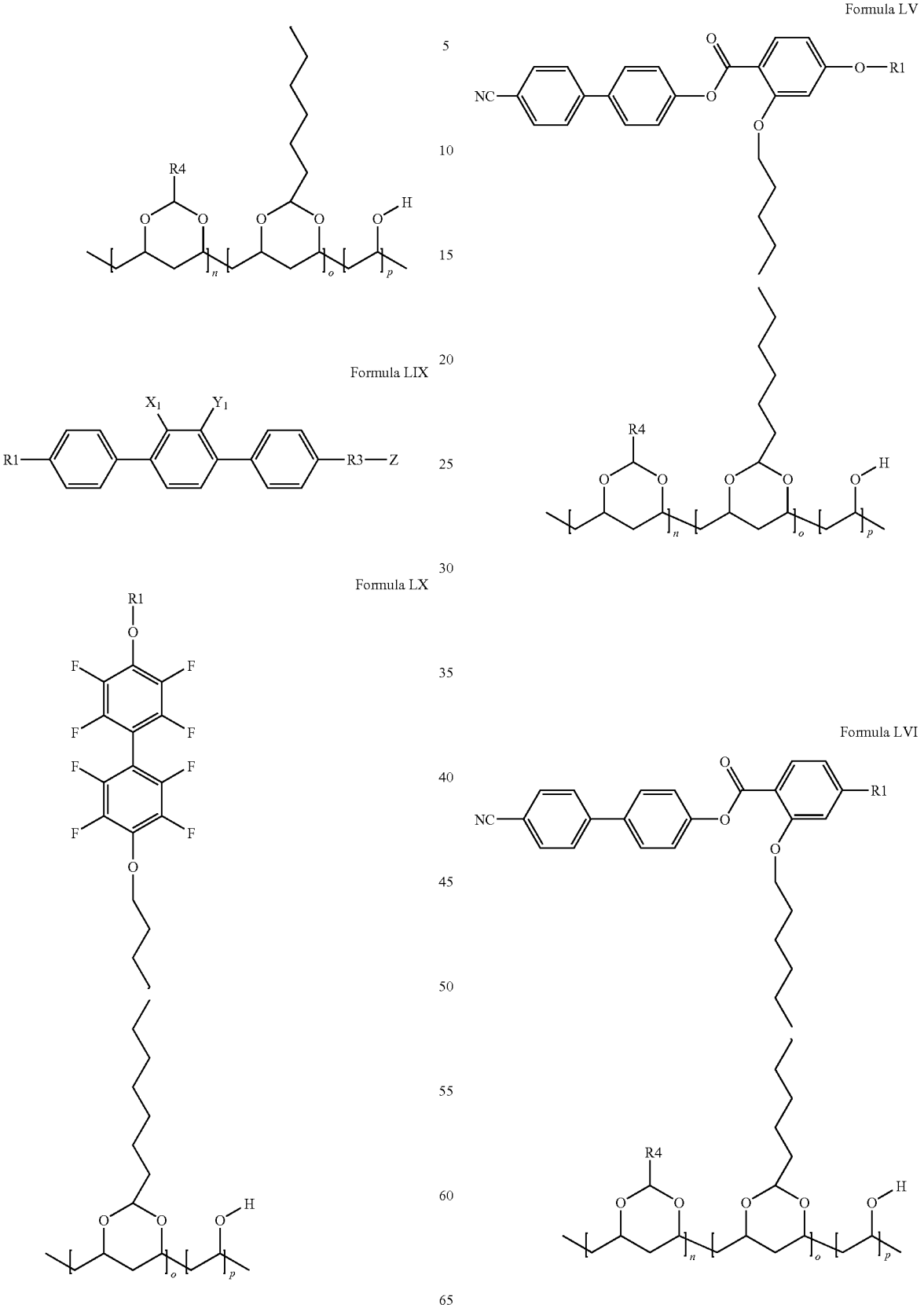

Formulas LVII to LX are examples of polymers, according to the invention, comprising side-chains ($S_1$) exhibiting permanent and/or induced dipole moments that in ordered phase provides negative dielectric anisotropy. These polymers are suitable for providing an initial field-off vertical alignment in, for instance, an out-of-plane switching liquid crystal device.

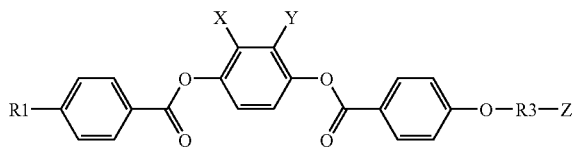

Formula LVII

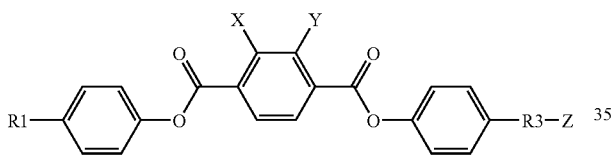

Formula LVIII

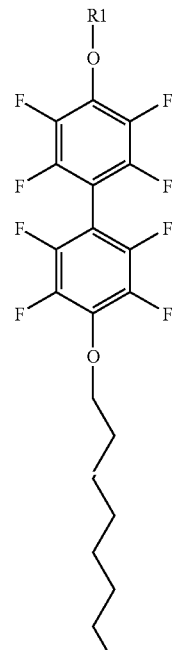

Formula LXI

Formula LXI represents examples of polymers, according to the invention, comprising side-chains ($S_1$) exhibiting permanent and/or induced dipole moments that in ordered phase provides negative dielectric anisotropy and side-chains ($S_3$) exhibiting no permanent and/or induced dipole moments and thus providing no dielectric anisotropy. These polymers are suitable for providing an initial field-off vertical alignment in, for instance, an out-of-plane switching liquid crystal device.

Formula LXII represents examples of polymers, according to the invention, comprising side-chains ($S_1$) having dimeric structures, each one comprising a first structural part exhibiting a permanent and/or induced dipole moment that in ordered phase provides positive dielectric anisotropy and a second structural part exhibiting a permanent and/or induced dipole moment that in ordered phase provides negative dielectric anisotropy. These polymers are suitable for providing an initial field-off planar alignment) in, for instance, an out-of-plane or in-plane switching liquid crystal device.

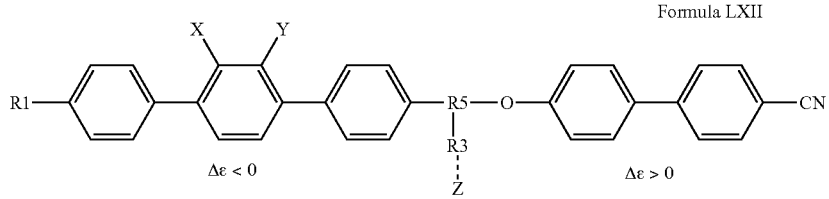

Formula LXII

Formulas LXIII to LXVII are examples of polymers, according to the invention, comprising side-chains ($S_1$) having dimeric structures, each one comprising a first structural part exhibiting a permanent and/or induced dipole moment that in ordered phase provides positive dielectric anisotropy and a second structural part exhibiting a permanent and/or induced dipole moment that in ordered phase provides negative dielectric anisotropy. These polymers are suitable for providing an initial field-off vertical alignment in, for instance, an out-of-plane switching liquid crystal device.

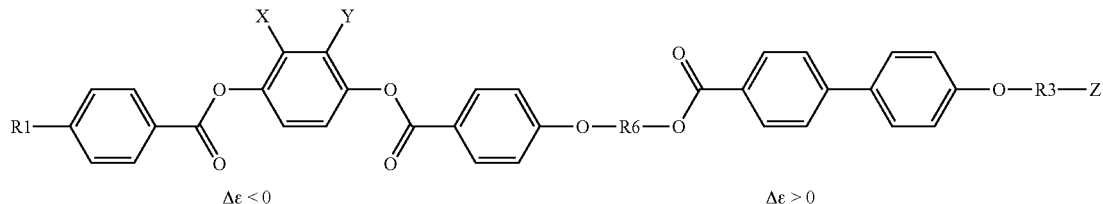

Formula LXIII

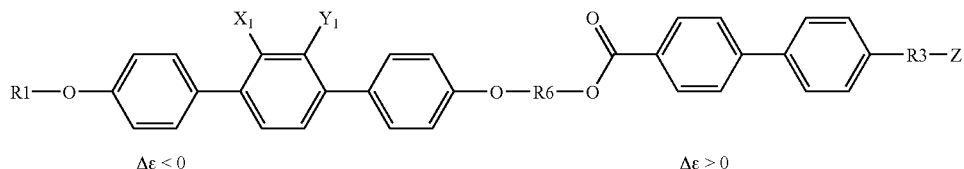

Formula LXIV

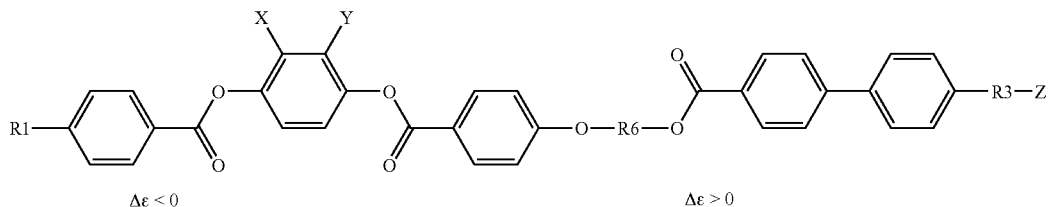

Formula LXV

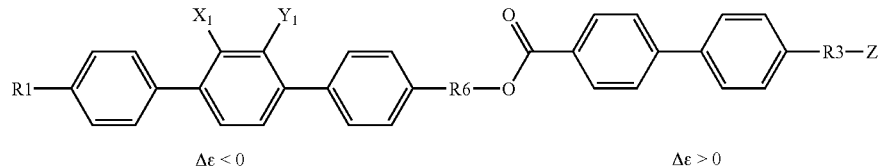

Formula LXVI

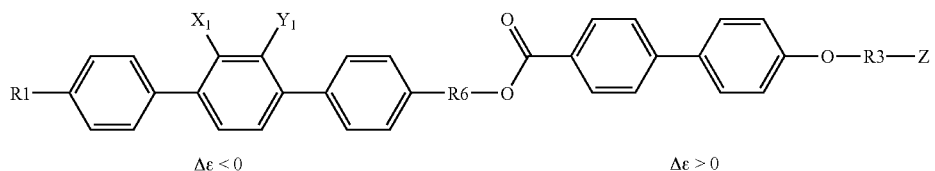

Formula LXVII

Formulas LXVIII to LXX are examples of polymers, according to the invention, comprising side-chains ($S_1$) having trimeric structures, each one comprising a first structural part exhibiting a permanent and/or induced dipole moment that in ordered phase provides positive dielectric anisotropy, a second structural part exhibiting a permanent and/or induced dipole moment that in ordered phase provides negative dielectric anisotropy, and a third structural part exhibiting a permanent and/or induced dipole moment that in ordered phase provides either positive or negative dielectric anisotropy. These polymers are suitable for providing an initial field-off planar alignment in, for instance, an out-of-plane or an in-plane switching liquid crystal device.

Formula LXVIII
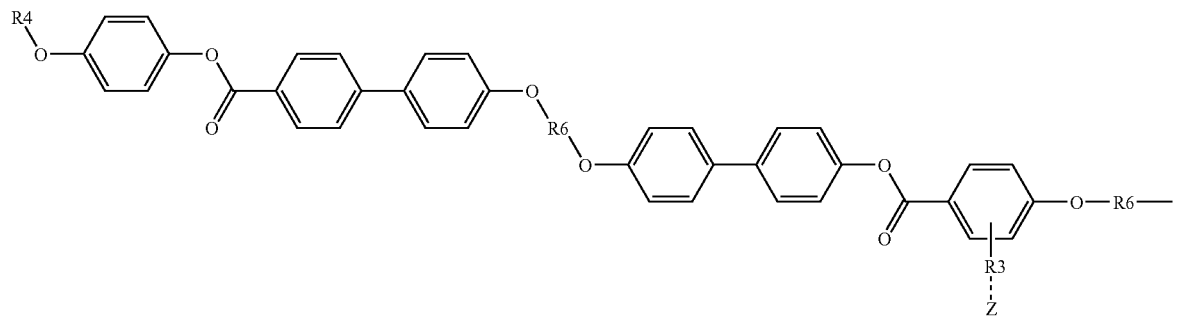
Formula LXIX
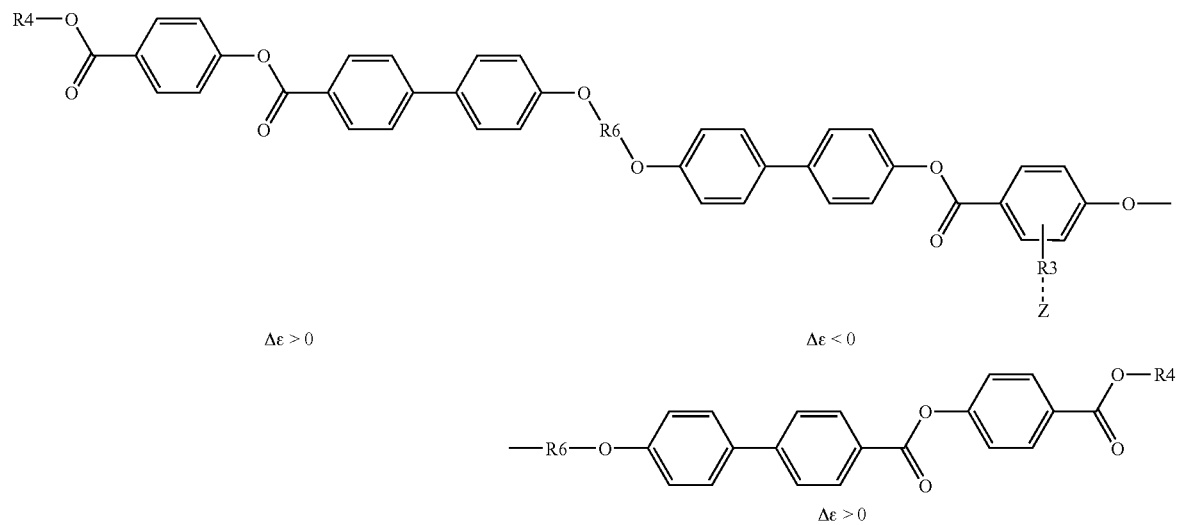
Formula LXX
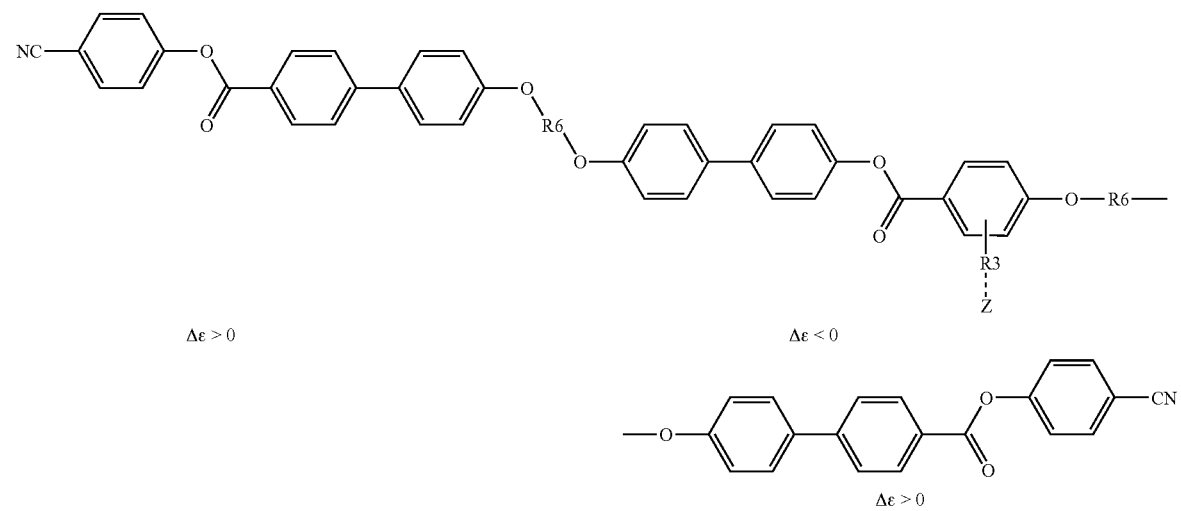

Polymers according to Formulas I to LXX wherein the polymeric backbone (Z) lacks directly coupled ring structures, and wherein each one of at least some of the side-chains comprises at least two unsubstituted and/or substituted phenyls coupled via a coupling selected from the group consisting of a carbon-carbon single bond (—), a carbon-carbon double bond containing unit (—CH═CH—), a carbon-carbon triple bond containing unit (—C≡C—), a methylene ester unit (—CH$_2$O—), an ethylene ester unit (—CH$_2$CH$_2$O—), an ester unit (—COO—) and an azo unit (—N═N—), exhibits a permanent and/or induced dipole moment that in ordered phase provides dielectric anisotropy, and is attached to the polymeric backbone via at least two spacing atoms, are in accordance with the present invention and have been found to have several advantages as disclosed above.

The polymer according to the invention comprises a polymeric backbone and side-chains attached thereto, wherein the polymeric backbone lacks directly coupled ring structures, and each side-chain of at least some of the side-chains comprises at least two unsubstituted and/or substituted phenyls coupled via a coupling selected from the group consisting of a carbon-carbon single bond (—), a carbon-carbon double bond containing unit (—CH═CH—), a carbon-carbon triple bond containing unit (—C≡C—), a methylene ester unit (—CH$_2$O—), an ethylene ester unit (—CH$_2$CH$_2$O—), an ester unit (—COO—) and an azo unit (—N═N—), exhibits a permanent and/or induced dipole moment that in ordered phase provides dielectric anisotropy, and is attached to the polymeric backbone via at least two spacing atoms, preferably at least five spacing atoms.

It shall be noted that the couplings given above may comprise substituted and/or unsubstituted atoms. For instance, a polymer according to the invention may comprise two phenyls coupled via a fluorinated carbon-carbon double bond containing unit, such as —CF═CF— or —CH═CF—.

The two phenyls are preferably coupled via only said coupling, i.e. no other atoms or bonds are positioned between the two phenyls.

As used herein a "side-chain" means a grouping of atoms that branches off from a straight-chain molecule (here polymeric backbone).

As used herein "directly coupled ring structures" means fused ring structures and ring structures coupled with single or multiple bonds only (i.e. ring structures coupled with one or more bonds only).

Examples of fused rings structures are:

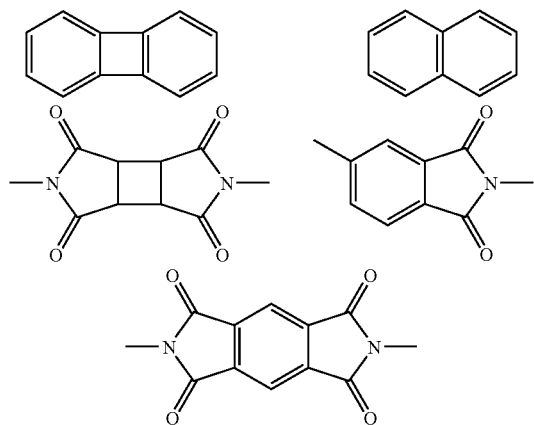

An example of ring structures coupled with a single bond only is:

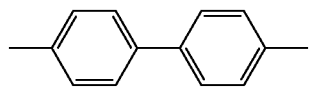

Thus, the repeating unit(s) of the polymeric backbone of the polymer according to the invention may, for instance, comprise ring structures coupled via at least one substituted or unsubstituted carbon atom, such as —(CH$_2$)$_n$—, —(CHR)$_n$— and —(CR$_2$)$_n$—, and/or at least one substituted or unsubstituted heteroatom.

Examples of preferred polymeric backbones lacking directly coupled ring structures are polyvinyl acetals. It shall be noted that as used herein polyvinyl acetals comprise polymers made from polyvinyl alcohols wherein some of the side-groups, such as up to 14%, may be unreacted hydroxyl groups. The polyvinyl alcohol used for preparing the polyvinyl acetal may be prepared by hydrolysing polyvinyl acetate. The degree of hydrolysis is then preferably ≧86%, meaning that up to 14% of the side-groups of the polymer according to the invention may still be acetate groups.

As used herein "an unsubstituted phenyl" means a phenyl group, such as —C$_6$H$_4$— and —C$_6$H$_5$.

As used herein "a substituted phenyl" means a phenyl group wherein one or more hydrogen atom(s) has (have) been replaced by (a) different atom(s) or group(s).

As used herein "spacing atoms" means atoms linking a side-chain to a polymeric backbone. These spacing atoms are preferably a molecular chain of at least 2, more preferably at least 5, and most preferably from 5 to 20, carbon atoms or heteroatoms. The molecular chain should preferably not comprise any cyclic structures (ring structures), thus the molecular chain is preferably a branched or unbranched linear molecular chain. The spacing atoms in the polymer according to the invention preferably constitute an aliphatic hydrocarbon chain, such as an alkyl, a siloxane chain, an ethylene glycol chain, or any combination thereof.

It shall be noted that the number of spacing atoms linking each side-chain to the polymeric backbone may vary along the polymer according to the invention.

As described above, the polymer according to the present invention is soluble in organic solvents, such as chloroform, tetrahydrofuran, mixtures of xylene and butyl acetate, dimethylacetamide, dimethylformamide or N-methylpyrrolidone. Preferably, the polymer according to the invention has a solubility in an organic solvent, such as any one of the solvents exemplified above, providing a stable solution at ambient conditions having a concentration within the range of from 0.01 to 10% (w/w). A high solubility of the polymer in an organic solvent enables the preparation of a polymer stock solution having a rather high polymer concentration, such as about 5% (w/w) polymer. Moreover, since the polymers according the invention are easy to dissolve in organic solvents, the supplier may even deliver them in solid state to the customer. Thus, the amount of inflammable and hazardous solvent transported from the polymer supplier to the customer, such as a LCD manufacturer, may be decreased.

Preferably, the polymeric backbone in the polymer according to the invention comprises a first type of randomly distributed units according to

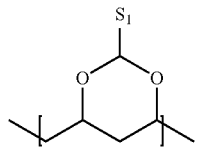

wherein $S_1$ represents a first side-chain comprising at least two unsubstituted and/or substituted phenyls coupled via a coupling selected from the group consisting of a carbon-carbon single bond (—), a carbon-carbon double bond containing unit (—CH═CH—), a carbon-carbon triple bond containing unit (—C≡C—), a methylene ester unit (—CH$_2$O—), an ethylene ester unit (—CH$_2$CH$_2$O—), an ester unit (—COO—) and an azo unit (—N═N—) and exhibiting a permanent and/or induced dipole moment that in ordered phase provides dielectric anisotropy, and at least two spacing atoms through which the first side-chain is attached to the polymeric backbone, and a second type of randomly distributed units according to

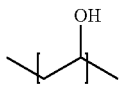

When the polymeric backbone in a polymer according to the invention comprises these types of randomly distributed units, the polymer is a polyvinyl acetal.

Furthermore, the polymeric backbone in the polymer according to the invention may preferably also comprise a third type of randomly distributed units according to

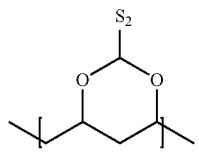

wherein $S_2$ represents a second side-chain, being different from $S_1$, exhibiting a permanent and/or induced dipole moment that in ordered phase provides dielectric anisotropy, and at least two spacing atoms through which the second side-chain is attached to the polymeric backbone. The dielectric anisotropy provided by $S_2$ may be different from the dielectric anisotropy provided by $S_1$.

Preferably, said second side-chain $S_2$ comprises at least two unsubstituted and/or substituted phenyls coupled via a coupling selected from the group consisting of a carbon-carbon single bond (—), a carbon-carbon double bond containing unit (—CH═CH—), a carbon-carbon triple bond containing unit (—C≡C—), a methylene ester unit (—CH$_2$O—), an ethylene ester unit (—CH$_2$CH$_2$O—), an ester unit (—COO—) and an azo unit (—N═N—).

The polymeric backbone of the polymer according to the invention may also comprise a further (third or fourth) type of randomly distributed units according to

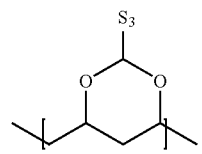

wherein $S_3$ represents a side-chain, being different from $S_1$ and $S_2$, exhibiting no permanent and/or induced dipole moment and thus providing no dielectric anisotropy. This type of unit may be incorporated in the polymeric backbone to obtain a polymer exhibiting a certain desired dielectric anisotropy in ordered phase using a desired specific side-chain $S_1$, optionally in combination with a desired specific side-chain $S_2$. Thus, the dielectric anisotropy of the polymer in ordered phase may be reduced using a side-chain $S_3$ exhibiting no permanent and/or induced dipole moment and thus providing no dielectric anisotropy.

An embodiment of a polymer according to the invention is a polymer comprising a polymeric backbone and side-chains attached thereto, wherein the polymeric backbone lacks directly coupled ring structures, and each side-chain of at least some of the side-chains comprises three unsubstituted and/or substituted phenyls coupled via two similar or different couplings selected from the group consisting of a carbon-carbon single bond (—), a carbon-carbon double bond containing unit (—CH═CH—), a carbon-carbon triple bond containing unit (—C≡C—), a methylene ester unit (—CH$_2$O—), an ethylene ester unit (—CH$_2$CH$_2$O—), an ester unit (—COO—) and an azo unit (—N═N—), exhibits a permanent and/or induced dipole moment that in ordered phase provides dielectric anisotropy, and is attached to the polymeric backbone via at least two spacing atoms. Examples of this type of embodiment are, for instance, given by Formulas XIX, XXX, LII, and LVII.

The invention also relates to a composition for use as a surface-director alignment layer in a liquid crystal device, said composition comprising at least one polymer according to the invention and a second polymer, such as a polyvinyl acetal. By changing the ratio between said at least one polymer according to the invention and said second polymer, desired characteristics and process parameters may be obtained.

The composition according to the invention may also comprise at least two polymers according to the invention.

The invention also relates to a surface-director alignment layer for use in a liquid crystal device, wherein the layer comprises at least one polymer according to the invention. The surface-director alignment layer may, for instance, comprise one polymer according to the invention or one polymer according to the invention in combination with a second polymer, such as a polyvinyl acetal or another polymer according to the invention.

Consequently, the invention also relates to the use of a polymer according to the invention as a surface-director alignment layer in a liquid crystal device.

Other uses of the polymers according to the invention might be in photo-alignment layers, polarizers, materials for optical recording, photo-chromic films for use in e.g. eyeglasses and car windows.

The invention will now be illustrated by means of the following non-limiting examples, wherein the following abbreviations are used: PCC=pyridinium chlorocromate, DCC=1,3-dicyclohexylcarbodimide, DMF=N,N-dimethylformamide, THF=tetrahydrofuran, TsOH=p-toluenesulfonic acid, and PVA=polyvinyl alcohol.

a) Examples of Synthetic Procedures for the Preparation of Polymers According to the Invention In the preparation of the polymers according to the invention, side-chain precursor(s) is (are) attached to a polymer lacking directly coupled ring structures. Examples of such polymers are polyvinyl alcohols.

The side-chain precursors used are either commercially available or may be prepared from commercially available starting materials according to, for instance, the type of procedures outlined in Examples 2 and 4 below.

Preferably, the side-chain precursor(s) is (are) attached to a polyvinyl alcohol through the formation of acetal units. An aldehyde or a low molar mass acetal group of the side-chain precursor is reacted with two neighbouring hydroxyl groups on the polyvinyl alcohol to form a desired high molar mass polyvinyl acetal. The reaction is preferably run in an amide or ether solvent, such as DMF, THF or dioxane. Furthermore, the reaction is preferably carried out in the presence of an acid catalyst, such as TsOH.

It is preferred to use a polyvinyl alcohol that is hydrolysed to at least 86% (i.e. 14% or less acetate groups left). The molar mass weight average ($M_w$) of the polyvinyl alcohol is preferably within the range of 10 000-40 000, more preferably within the range 13 000-23 000.

The side-chain precursors used in the examples below are of two types:

a) Molecules exhibiting a permanent and/or induced dipole moment that in ordered phase provides dielectric anisotropy (molecules generally exhibiting liquid crystalline behaviour) and comprising at least two unsubstituted and/or substituted phenyls coupled via a coupling selected from the group consisting of a carbon-carbon single bond (—), a carbon-carbon double bond containing unit (—CH=CH—), a carbon-carbon triple-bond containing unit (—C≡C—), a methylene ester unit (—CH$_2$O—), an ethylene ester unit (—CH$_2$CH$_2$O—), an ester unit (—COO—) and an azo unit (—N=N—). This type of side-chain precursors also includes at least two, preferably at least five, spacing atoms as described in more detail above. Thus, the side-chain is attached to the polymeric backbone via said at least two spacing atoms. Examples of this type of side-chain precursor are side-chain precursors I, II, III, IV, V, VI, VII, VIII, IX, X, XI, XII, XIII, XIV, and XV according to the formulas given below.

b) Molecules, such as simple alkyl aldehydes, exhibiting no permanent and/or induced dipole moment and thus providing no dielectric anisotropy. An example of this type of side-chain precursor is octanal.

It shall also be noted that polymers according to the invention may alternatively be prepared by polymerising monomers, preferably mesogenic monomers, having side-chains into a polymeric backbone lacking directly coupled ring structures, wherein each side-chain of at least some of the side-chains comprises at least two unsubstituted and/or substituted phenyls coupled via a coupling selected from the group consisting of a carbon-carbon single bond (—), a carbon-carbon double bond containing unit (—CH=CH—), a carbon-carbon triple bond containing unit (—C≡C—), a methylene ester unit (—CH$_2$O—), an ethylene ester unit (—CH$_2$CH$_2$O—), an ester unit (—COO—) and an azo unit (—N=N—), and exhibits a permanent and/or induced dipole moment that in ordered phase provides dielectric anisotropy. The polymer prepared according to this method is preferably a polyvinyl acetal. The polymerisation may be performed either before or after application on a substrate surface.

In all examples below, the solvents were dried before use thereof by passing the solvents through a short chromatography column containing ICN Alumina N super 1 from ICN Biomedicals GmbH Germany.

The maximum degree of functionalisation in the examples below is, due to statistical reasons 86%. Hence, a minimum of 14% of the initial hydroxyl groups remain after completion of the reaction.

In all the examples below, standard reactions well-known to a person skilled in the art were used for the preparation of the polymers.

EXAMPLE 1

Functionalisation of PVA with 4'-(11,11-diethoxyundecyloxy)-biphenyl-4-carbonitrile (side-chain precursor I) and octanal In a 100 ml flask, 0.70 g of side-chain precursor I (see D Lacey et al, Macromolecular Chemistry and Physics 200, 1222-1231 (1999)), 0.081 g of octanal, 0.198 g of PVA (number average molecular weight, $M_w$, about 15 000), and 0.10 g of TsOH were dissolved in 20 ml of dry DMF and stirred at about 55° C. for 24 hours.

The reaction mixture was then poured into 150 ml of methanol and a polymer was precipitated. The precipitate was collected and dissolved in 5 ml of chloroform and reprecipitated in 100 ml of methanol. The re-precipitation was repeated twice.

The yield was 0.29 g of polymer (i.e. 40% calculated on the amount of added polyvinyl alcohol). Losses were due to the presence of low molar mass polymer that was removed in the workup procedure (i.e. the precipitation procedure).

$^1$H-NMR spectrum of the obtained polymer was in accordance with structure A of Scheme III. The side-chain molar ratio I/octanal in the polymer as determined using NMR was found to be 2/1 (=o/n in structure A). Furthermore, (o+n)/p was found to be about 42/16. (Polymer A is also given by Formula XVI.)

The side-chain formed from side-chain precursor I is attached to the polymeric backbone via spacing atoms in the form of —(CH$_2$)$_{10}$—.

Scheme III

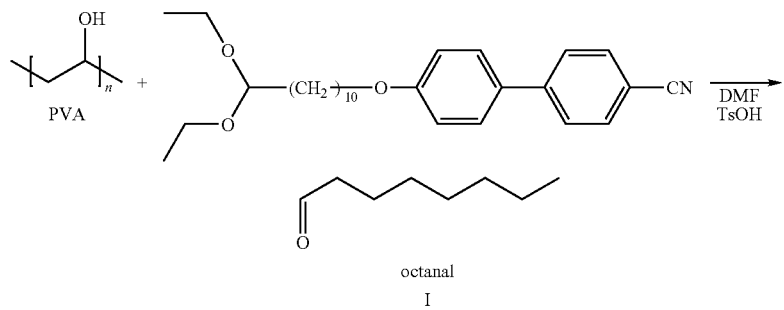

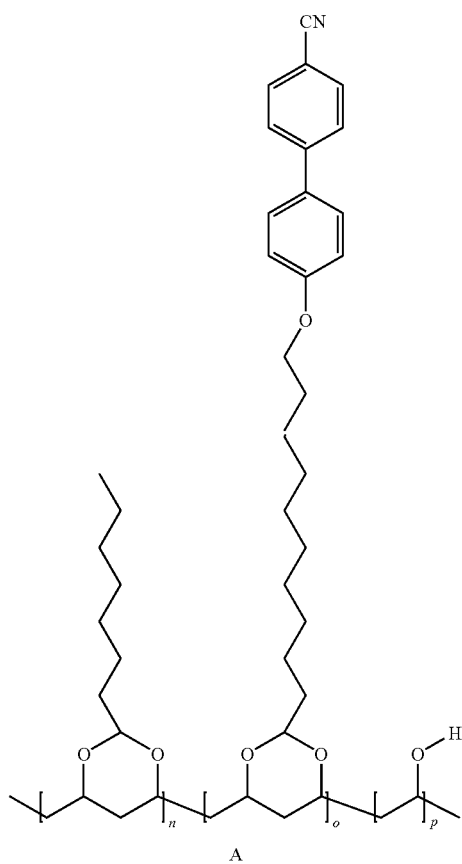

EXAMPLE 2

Functionalisation of PVA with 4'-(11,11-diethoxy-undecyloxy)-biphenyl-4-carboxylic acid ethyl ester (side-chain precursor II) and octanal Side-chain precursor II was prepared according to Scheme IV.

In a 250 ml flask, 5.0 g of 4'-hydroxy-4-biphenyl-carboxylic acid was dissolved in 100 ml of absolute ethanol and cooled in an ice bath. 2.5 ml of thionyl chloride was added in small portions. The reaction mixture was then refluxed for 4 h and allowed to attain room temperature. The formed precipitate was collected on a filter, washed with two 25 ml portions of ethanol and recrystallised from toluene. The yield was 4.8 g of 4'-hydroxy-4-biphenylcarboxylic acid ethyl ester.

In a 250 ml round bottomed flask, 12.5 g of 11-bromoundecanol was dissolved in 50 ml of dichloromethane. A slurry of 16.2 g pyridiniumchlorochromate (PCC) in 100 ml of dichloromethane was added. The mixture was stirred at room temperature for 2 hours and then poured into 300 ml of diethylether. A brown solid was filtered off and the liquid phase was passed through a short column of silica gel using diethylether as eluent. The organic solvent was evaporated under reduced pressure and the residue was dissolved in absolute ethanol (EtOH) and anhydrous calcium chloride was added together with a small amount of p-toluene sulphonic acid (not shown in Scheme IV). This reaction mixture was left at room temperature over night. The solvent was removed under vacuum and the residue was taken up in diethyl ether and washed with saturated sodium bicarbonate solution. The organic layer was dried over magnesium sulphate, filtered, and evaporated until no more solvent came off. The residue was dissolved in 15 ml of ethyl acetate/petroleum ether 1:4 mixture (v/v) and purified using column chromatography with said solvent mixture as eluent. 9.5 g of 11-bromoundecanal diethyl acetal was isolated. The $^1$H-NMP spectrum of the compound was found to be in accordance with the structure in Scheme IV.

A 100 ml round bottomed flask was charged with 2.7 g 11-bromoundecanal diethyl acetal, 2.42 g of 4'-hydroxy-4-biphenylcarboxylic acid ethyl ester, 50 ml of acetone, 2 g of anhydrous potassium carbonate and 0.2 g of potassium iodide (not shown in Scheme IV). The mixture was refluxed for 72 hours.

Approximately 40% of the solution part of the reaction mixture was removed and evaporated till dryness, dissolved in 15 ml of ethyl acetate/petroleum ether 1:4 and purified using column chromatography on silica gel using this solvent mixture as eluent. 0.9 g of 4'-(11,11-diethoxy-undecyloxy)-biphenyl-4-carboxylic acid ethyl ester (i.e. precursor II) was isolated. $^1$H-NMR spectra were in accordance with structure II of Scheme IV.

In a 100 ml flask, 0.80 g of side-chain precursor II, 0.186 g of octanal, 0,097 g of PVA ($M_w$ about 15 000) and 0.1 g of TsOH were dissolved in 25 ml of dry DMF and stirred at about 60° C. for 24 hours.

The reaction mixture was then poured into 250 ml of methanol and a polymer was precipitated. The precipitate was collected and dissolved in 5 ml of chloroform and reprecipitated in 100 ml of methanol. The re-precipitation was repeated twice.

The yield was 0.44 g of polymer. Losses were due to the presence of low molar mass polymer that was removed in the workup procedure.

$^1$H-NMR spectrum of the obtained polymer was in accordance with structure B of Scheme V. The side-chain molar ratio II/octanal in the polymer as determined using NMR was found to be 7/3 (=o/n in structure B). (Polymer B is also given in Formula XV.)

The side-chain formed from side-chain precursor II is attached to the polymeric backbone via spacing atoms in the form of —$(CH_2)_{10}$—.

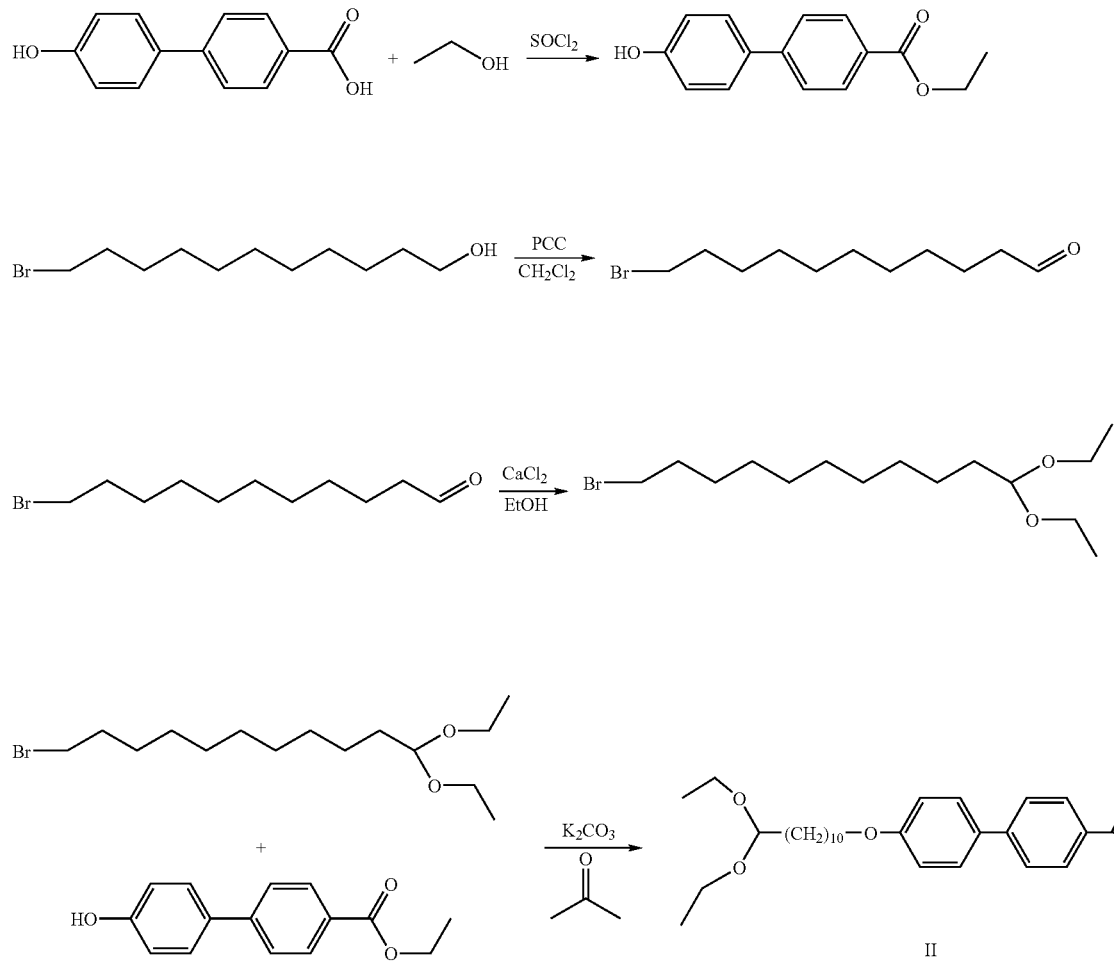

Scheme IV

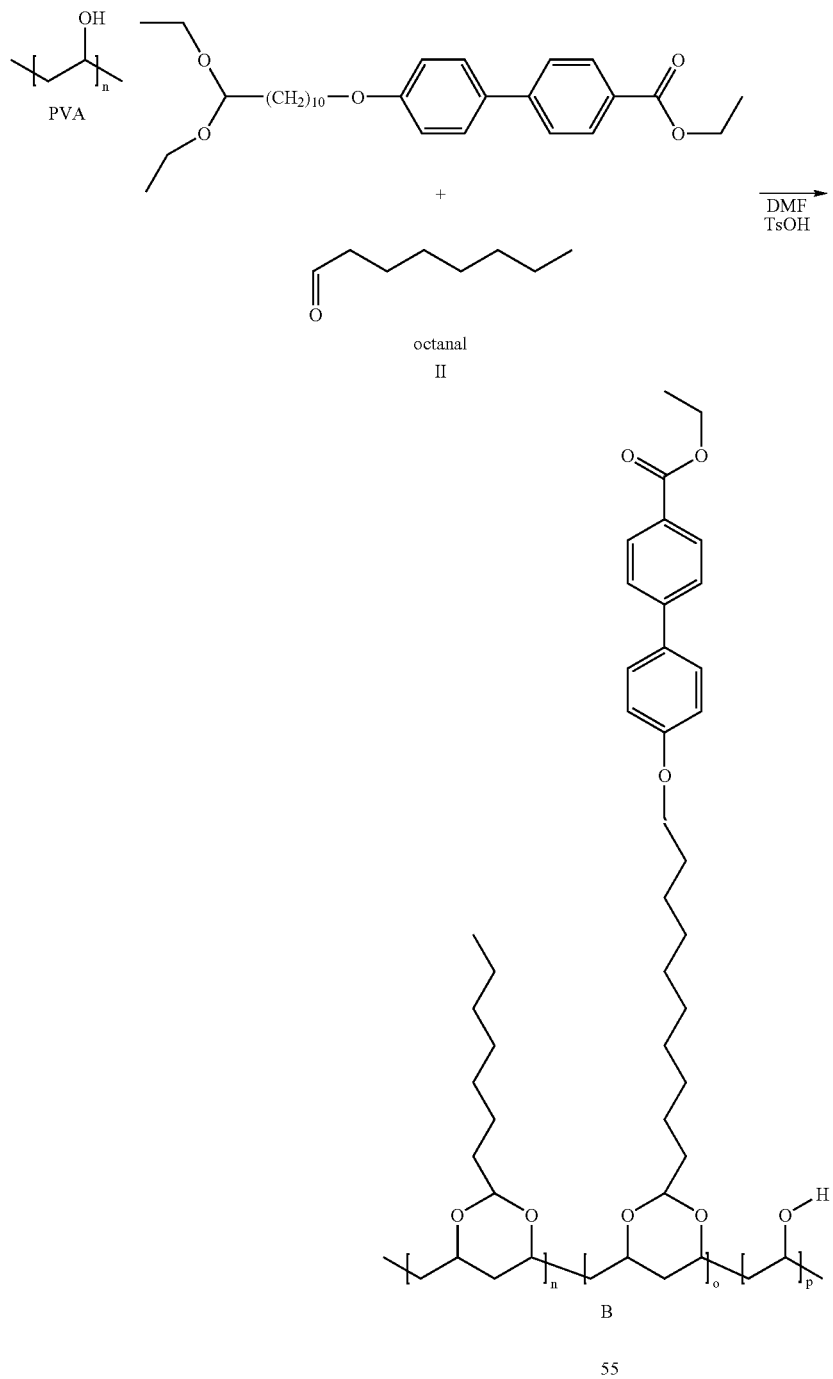

EXAMPLE 3

Functionalisation of PVA with 4'-(11,11-diethoxy-undecyloxy)-biphenyl-4-carboxylic acid 4-ethoxy-carbonyl-phenyl ester (side-chain precursor III) and octanal In a 50 ml flask, 0.2 g of side-chain precursor III, 0.029 g of octanal, 0.05 g of PVA ($M_w$ about 15 000), and TsOH were dissolved in 10 ml of dry DMF and stirred at about 55° C. for 24 hours.

The reaction mixture was then poured into 150 ml of methanol and a polymer was precipitated. The precipitate was collected and dissolved in 5 ml of chloroform and precipitated in 100 ml methanol. The re-precipitation was repeated twice.

The yield was 0.11 g of polymer. Losses were due to the presence of low molar mass polymer that was removed in the workup procedure.

$^1$H-NMR spectrum of the obtained polymer was in accordance with structure C of Scheme VI. The side-chain molar ratio III/octanal in the polymer as determined using NMR was found to be 1.1/1 (=o/n in structure C).

The side-chain formed from side-chain precursor III is attached to the polymeric backbone via spacing atoms in the form of —(CH$_2$)$_{10}$—.
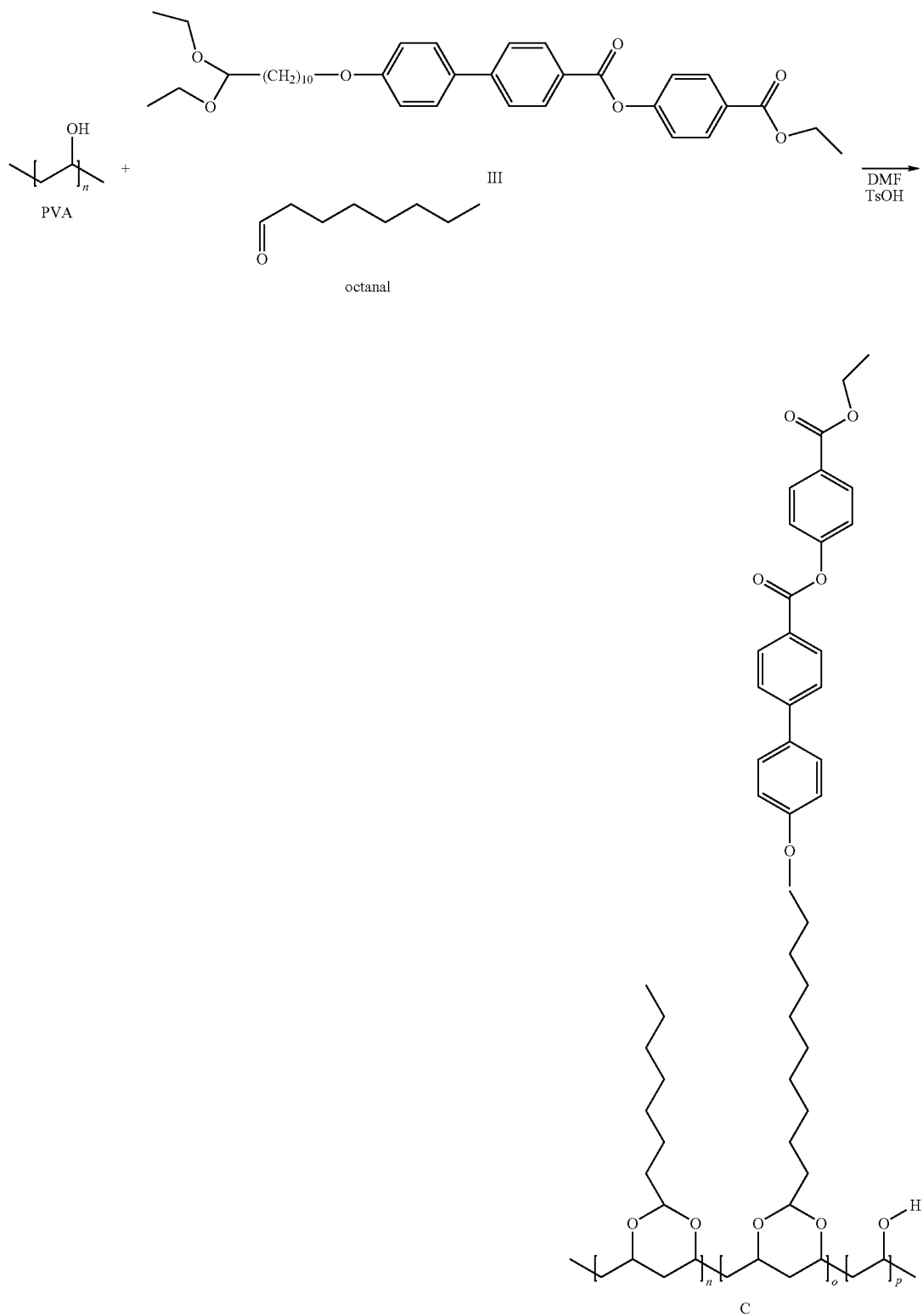

EXAMPLE 4

Functionalisation of PVA with 4'-(11,1'-diethoxy-undecyloxy)-biphenyl-4-carboxylic acid 4-methoxy phenyl ester (side-chain precursor IV) and octanal Side-chain precursor IV was prepared according to Scheme IV and Scheme VII.

To the remaining 60% of the solution part of the reaction mixture described in Example 2, 40 ml of ethanol, 2 g of potassium hydroxide and 5 ml of water was added and this mixture was refluxed for 48 hours. The mixture was acidified with hydrochloric acid, poured into water and extracted 5 times with diethyl ether. 20 ml of the organic phase was dried over magnesium sulphate. The solvent was removed under vacuum and the product was recrystallised from toluene. The yield was 1.8 g of 4'-(11,11-diethoxy-undecyloxy)-biphenyl-4-carboxylic acid.

In a 50 ml flask 0.54 g of 4'-(11,11-diethoxy-undecyloxy)-biphenyl-4-carboxylic acid, 20 ml of dry dichloromethane (not shown in Scheme VII), 0.05 g of 4-( N,N-dimethylamino)-pyridine (not shown in Scheme VII), and 0.24 g of 4-methoxyphenol were mixed. The mixture was cooled on an ice-water bath and 0.31 g of 1,3-dicyclohexylcarbodiimide (not shown in Scheme VII) was added. The reaction mixture was allowed to attain room temperature and stirring was continued for 24 hours. The reaction mixture was then filtered and the solvent was removed under vacuum. The product was purified using column chromatography with toluene/ethyl acetate as eluent run in a gradient manner. The yield was 0.46 g of 4'-(11,11-diethoxy-undecyloxy)-biphenyl-4-carboxylic acid 4-methoxy-phenyl ester (i.e. precursor IV). $^1$H-NMR spectra were in accordance with structure IV of Scheme VII.

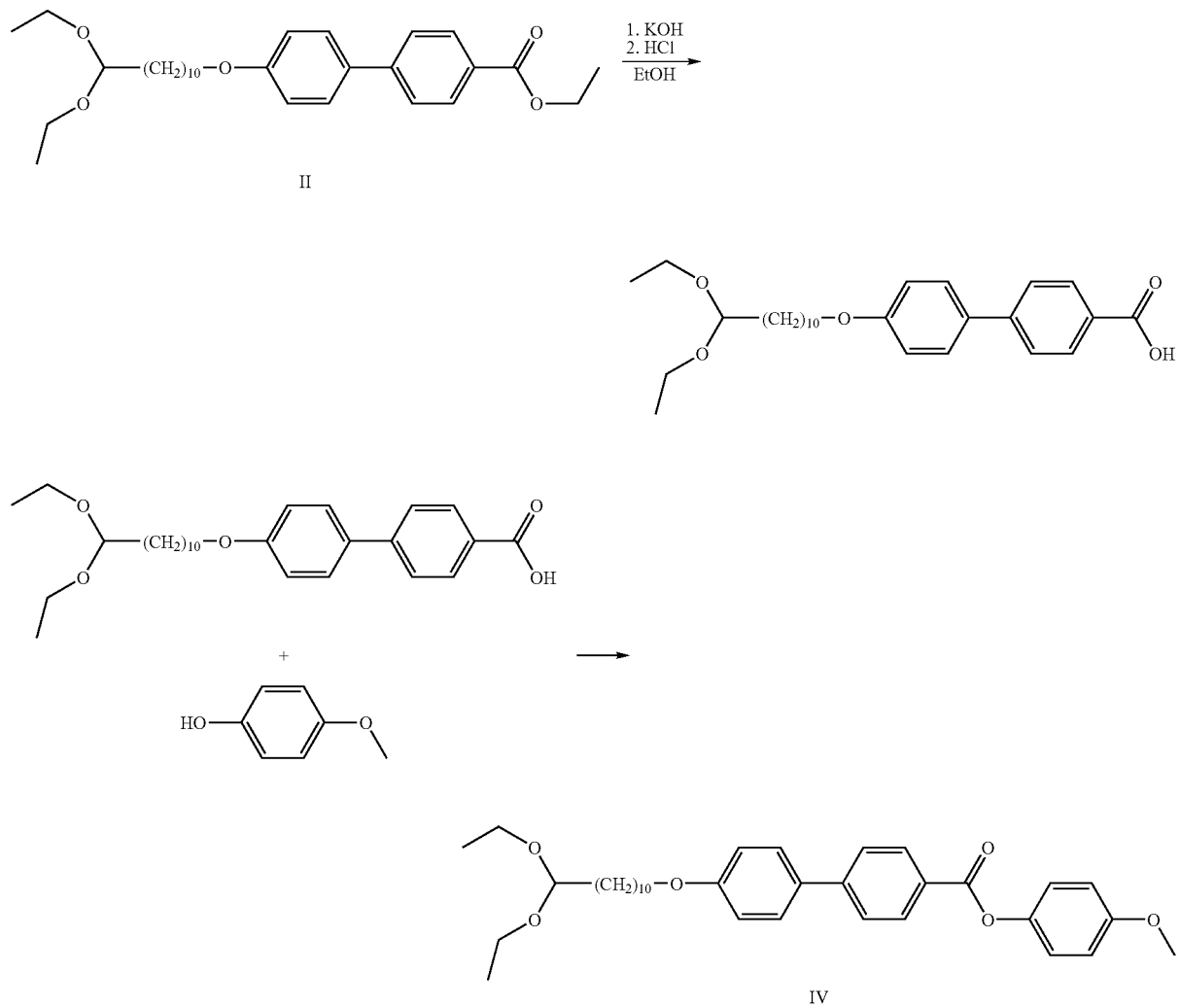

In a 100 ml flask, 0.58 g of side-chain precursor IV, 0.093 g of octanal, 0,049 g of PVA ($M_w$ about 15 000) and 0.1 g of TsOH were dissolved in 25 ml of dry THF and stirred at about 60° C. for 24 hours.

The reaction mixture was then poured into 250 ml of methanol and a polymer was precipitated. The precipitate was collected and dissolved in 5 ml of chloroform and reprecipitated in 100 ml of methanol. The re-precipitation was repeated twice.

The yield was 0.26 g of polymer. Losses were due to the presence of low molar mass polymer that was removed in the workup procedure.

$^1$H-NMR spectrum of the obtained polymer was in accordance with structure D of Scheme VIII. The side-chain molar ratio IV/octanal in the polymer as determined using NMR was found to be 2.2/1 (=o/n in structure D). (Polymer D is also given in Formula XVII.)

The side-chain formed from side-chain precursor IV is attached to the polymeric backbone via spacing atoms in the form of —(CH$_2$)$_{10}$—.

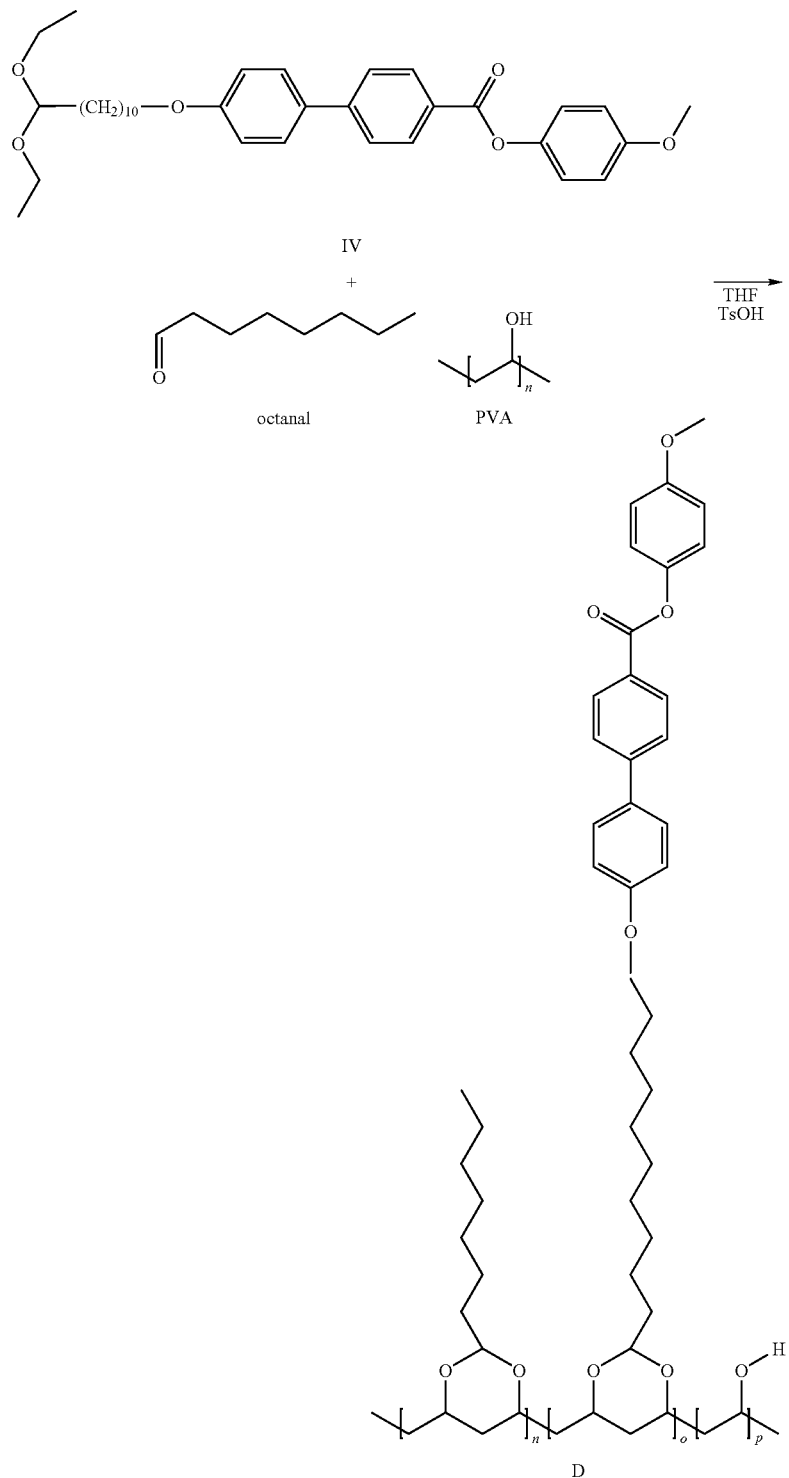

Scheme VIII

EXAMPLE 5

Functionalisation of PVA with 4'-(11,11-diethoxy-undecyloxy)-biphenyl-4-carboxylic acid 4-(1-butoxy-carbonyl-ethoxy)-phenyl ester (side-chain precursor V) and octanal In a 100 ml flask, 0.61 g of side-chain precursor V, 0.26 g of octanal, 0,26 g of PVA ($M_w$ about 15,000), and 0.02 g of TsOH were dissolved in 25 ml of dry DMF and stirred at about 60° C. for 24 hours.

The reaction mixture was then poured into 250 ml of methanol and a polymer was precipitated. The precipitate was collected and dissolved in 7 ml of THF and reprecipitated in 75 ml of methanol. The re-precipitation was repeated twice.

The yield was 0.40 g of polymer. Losses were due to the presence of low molar mass polymer that was removed in the workup procedure.

$^1$H-NMR spectrum of the obtained polymer was in accordance with structure E of Scheme IX. The side-chain molar ratio V/octanal in the polymer as determined using NMR was found to be 1/2 (=o/n in structure E).

The side-chain formed from side-chain precursor V is attached to the polymeric backbone via spacing atoms in the form of —$(CH_2)_{10}$—.

Scheme IX

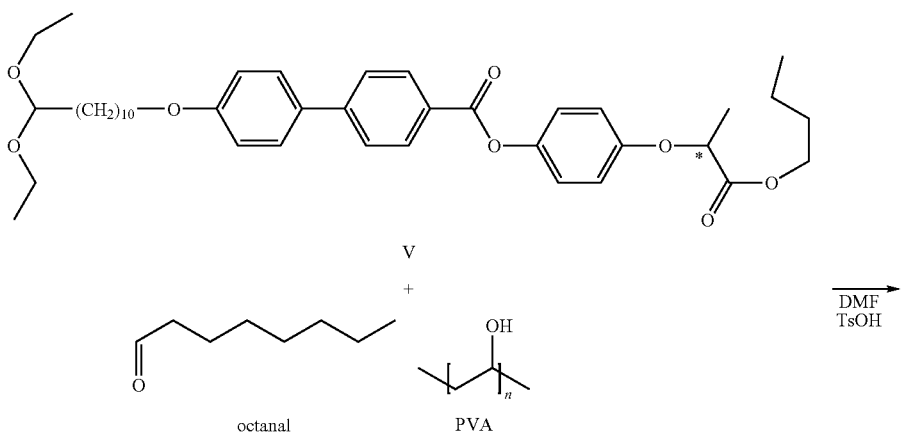

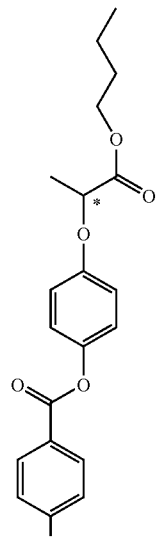

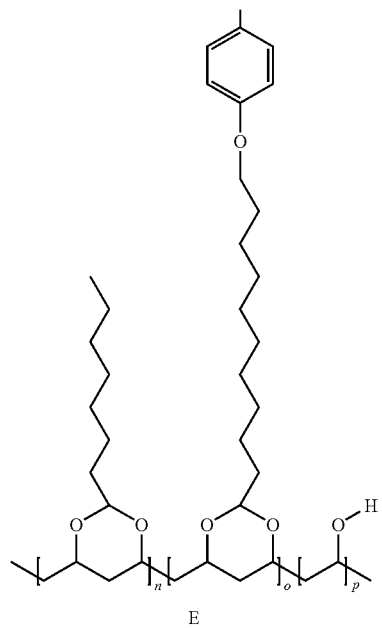

E

EXAMPLE 6

Functionalisation of PVA with 4'-(11,11-diethoxy-undecyloxy)-biphenyl-4-carboxylic acid cyclohexyl ester (side-chain precursor VI) and octanal In a 50 ml flask, 0.36 g of side-chain precursor VI, 0.06 g of octanal, 0.10 g of PVA ($M_w$ about 15 000) and 0.1 g TsOH were dissolved in 10 ml of dry DMF and stirred at about 55° C. for 24 hours.

The reaction mixture was then poured into 150 ml of methanol and a polymer was precipitated. The precipitate was collected and dissolved in 5 ml of chloroform and reprecipitated in 100 ml of methanol. The re-precipitation was repeated twice.

The yield was 0.24 g of polymer. Losses were due to the presence of low molar mass polymer that was removed in the workup procedure.

$^1$H-NMR spectrum of the obtained polymer was in accordance with structure F of Scheme X. The side-chain molar ratio VI/octanal in the polymer as determined using NMR was found to be 1.6/1 (=o/n in structure F).

The side-chain formed from side-chain precursor VI is attached to the polymeric backbone via spacing atoms in the form of —$(CH_2)_{10}$—.

Scheme X

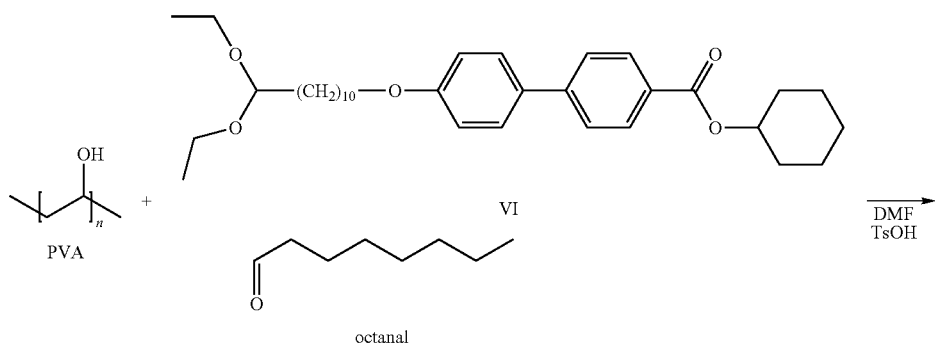

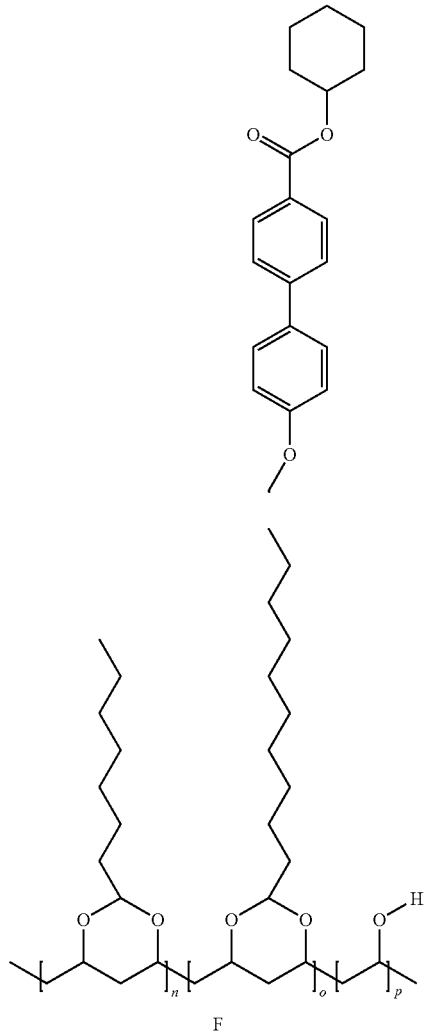

F

EXAMPLE 7

Functionalisation of PVA with 4'-(11,11-diethoxy-undecyloxy)-4'-undec-10-enyloxy-biphenyl (side-chain precursor VII) and octanal In a 50 ml flask, 0.40 g of side-chain precursor VII, 0.055 g of octanal, 0.10 g of PVA ($M_w$ about 15 000), and 0.1 g TsOH were dissolved in 10 ml of dry DMF and stirred at about 55° C. for 24 hours.

The reaction mixture was then poured into 150 ml of methanol and a polymer was precipitated. The precipitate was collected and dissolved in 5 ml of chloroform and reprecipitated in 100 ml of methanol. The re-precipitation was repeated twice.

The yield was 0.19 g of polymer. Losses were due to the presence of low molar mass polymer that was removed in the workup procedure.

$^1$H-NMR spectrum of the obtained polymer was in accordance with structure G of Scheme XI. The side-chain molar ratio VII/octanal in the polymer as determined using NMR was found to be 1.8/1 (=o/n in structure G).

The side-chain formed from side-chain precursor VII is attached to the polymeric backbone via spacing atoms in the form of —$(CH_2)_{10}$—.

Scheme XI
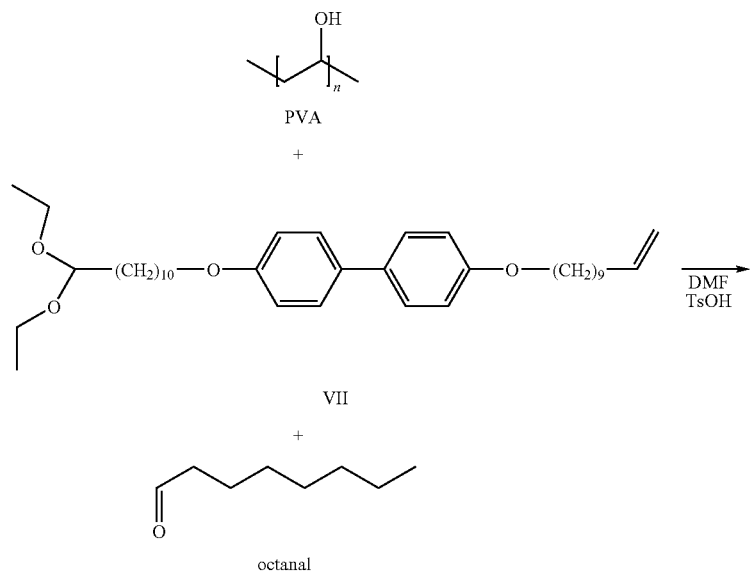
VII
octanal
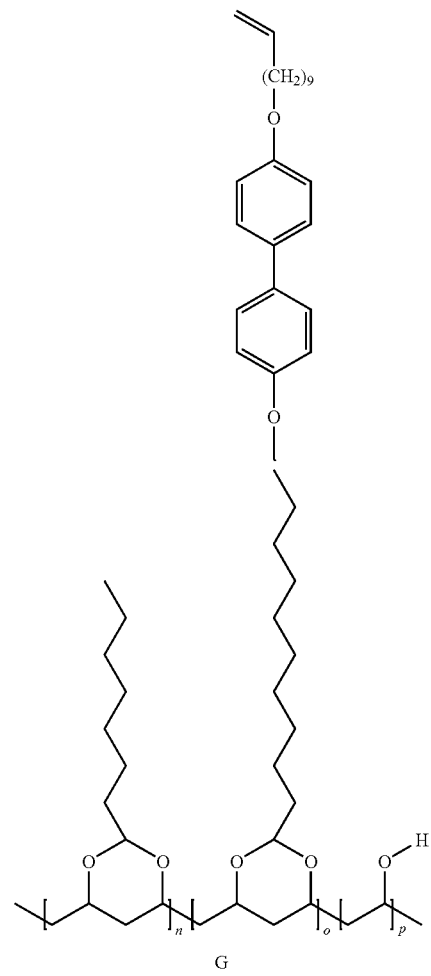
G

EXAMPLE 8

Functionalisation of PVA with 4'-(11,11-diethoxy-undecyloxy)-biphenyl-4-carboxylic acid 4-ethoxy-carbonyl-phenyl ester (side-chain precursor III), 4'-(11,11-diethoxy-undecyloxy)-4'-undec-10-enyloxy-biphenyl (side-chain precursor VII) and octanal In a 100 ml flask, 0.11 g of side-chain precursor III, 0.07 g of side-chain precursor VII, 0.018 g of octanal, 0.037 g of PVA ($M_w$ about 15 000), and 0.03 g of TsOH, were dissolved in 10 ml of dry DMF and stirred at about 55° C. for 48 hours.

The reaction mixture was then poured into 150 ml of methanol and a polymer was precipitated. The precipitate was collected and dissolved in 5 ml of chloroform and reprecipitated in 100 ml of methanol. The re-precipitation was repeated twice.

The yield was 0.09 g of polymer. Losses were due to the presence of low molar mass polymer that was removed in the workup procedure.

$^1$H-NMR spectrum of the obtained polymer was in accordance with structure H of Scheme XII.

The side-chain formed from side-chain precursor III is attached to the polymeric backbone via spacing atoms in the form of —$(CH_2)_{10}$— and the side-chain formed from side-chain precursor VII is attached to the polymeric backbone via spacing atoms in the form of —$(CH_2)_{10}$—.

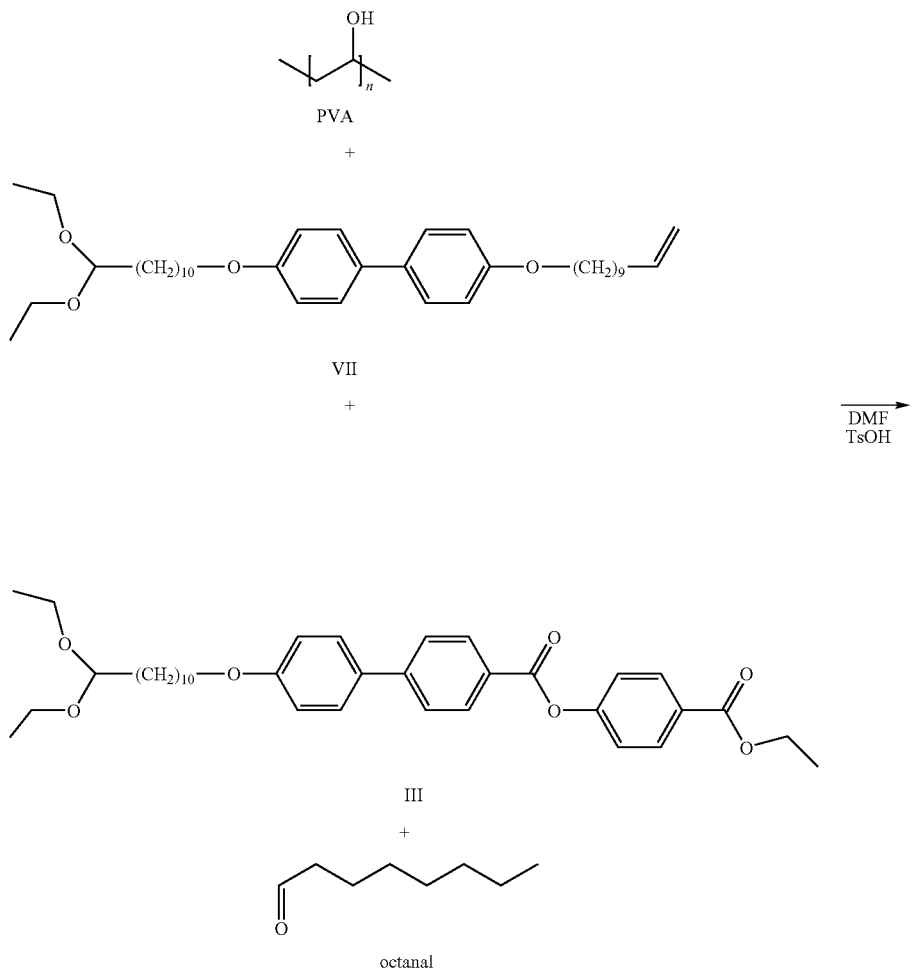

-continued

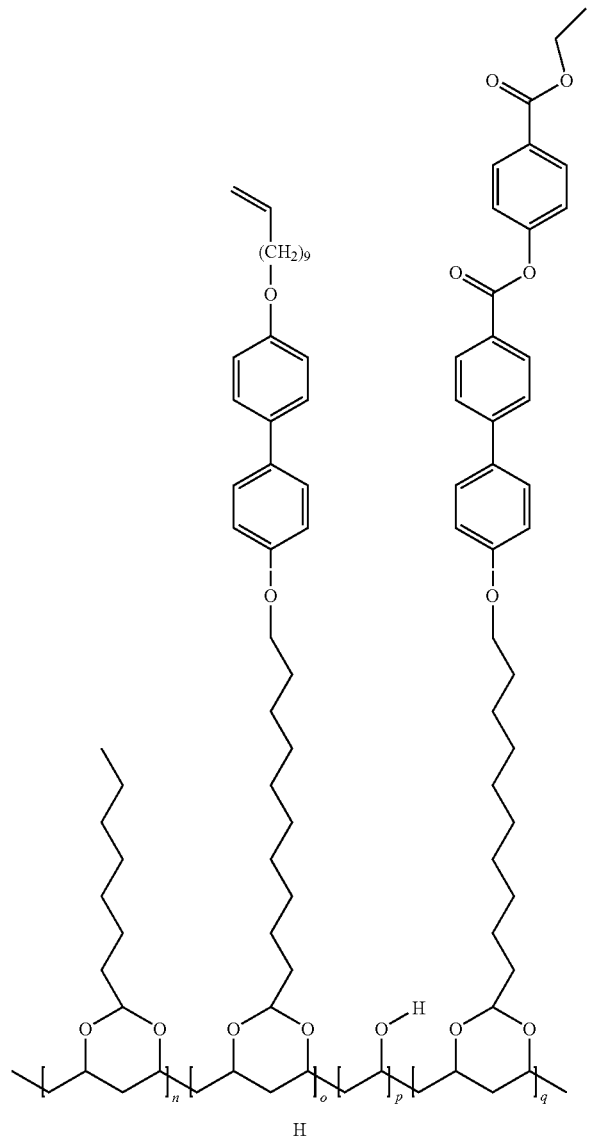

EXAMPLE 9

Functionalisation of PVA with [4-(11,11-diethoxy-undecyloxy)-phenyl-(4-ethoxy-phenyl)-diazene (side-chain precursor VIII) and octanal In a 100 ml flask, 0.82 g of side-chain precursor VIII, 0.13 g of octanal, 0.24 g of PVA ($M_w$ about 15 000), and 0.1 g of TsOH were dissolved in 25 ml of dry DMF and stirred at about 60° C. for 24 hours.

The reaction mixture was then poured into 250 ml of methanol and a polymer was precipitated. The precipitate was collected and dissolved in 5 ml of chloroform and reprecipitated in 100 ml of methanol. The re-precipitation was repeated twice.

The yield was 0.48 g of polymer. Losses were due to the presence of low molar mass polymer that was removed in the workup procedure.

$^1$H-NMR spectrum of the obtained polymer was in accordance with structure I of Scheme XIII. The side-chain molar ratio VIII/octanal in the polymer as determined using NMR was found to be 1.8/1 (=o/n in structure I).

The side-chain formed from side-chain precursor VIII is attached to the polymeric backbone via spacing atoms in the form of —$(CH_2)_{10}$—.

Scheme XIII

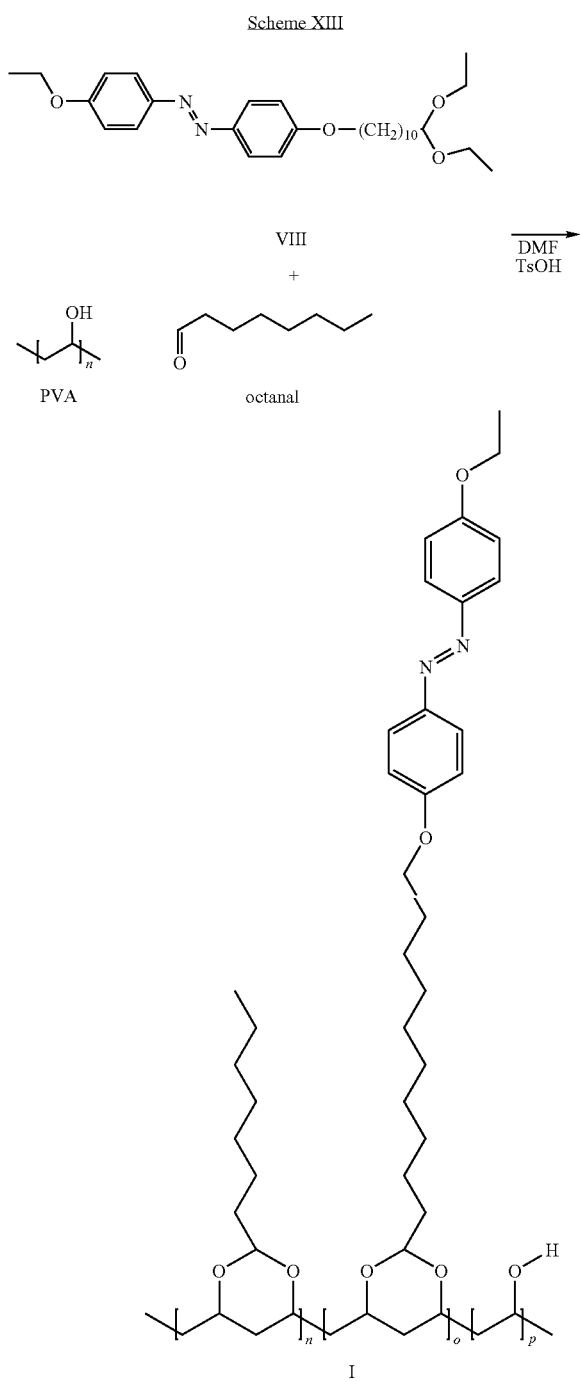

EXAMPLE 10

Functionalisation of PVA with 2-[4-(11,11-diethoxy-undecyloxy)-3-(4-ethoxy-phenylazo)-phenoxy]-propionic acid butyl ester (side-chain precursor IX) and octanal In a 100 ml flask, 1.0 g of side-chain precursor IX, 0.205 g of octanal, 0.25 g of PVA ($M_w$ about 15 000), and 0.1 g of TsOH were dissolved in 25 ml of dry THF and stirred at about 60° C. for 24 hours.

The reaction mixture was then poured into 250 ml of methanol and a polymer was precipitated. The precipitate was collected and dissolved in 5 ml of chloroform and reprecipitated in 100 ml of methanol. The re-precipitation was repeated twice.

The yield was 0.56 g of polymer. Losses were due to the presence of low molar mass polymer that was removed in the workup procedure.

$^1$H-NMR spectrum of the obtained polymer was in accordance with structure J of Scheme XIV. The side-chain molar ratio IX/octanal in the polymer as determined using NMR was found to be 1/1 (=o/n in structure J). Furthermore, (o+n)/p was found to be about 43/18. (Polymer J is also given by Formula XXXIV.)

The side-chain formed from side-chain precursor IX is attached to the polymeric backbone via spacing atoms in the form of —$(CH_2)_{10}$—.

Scheme XIV

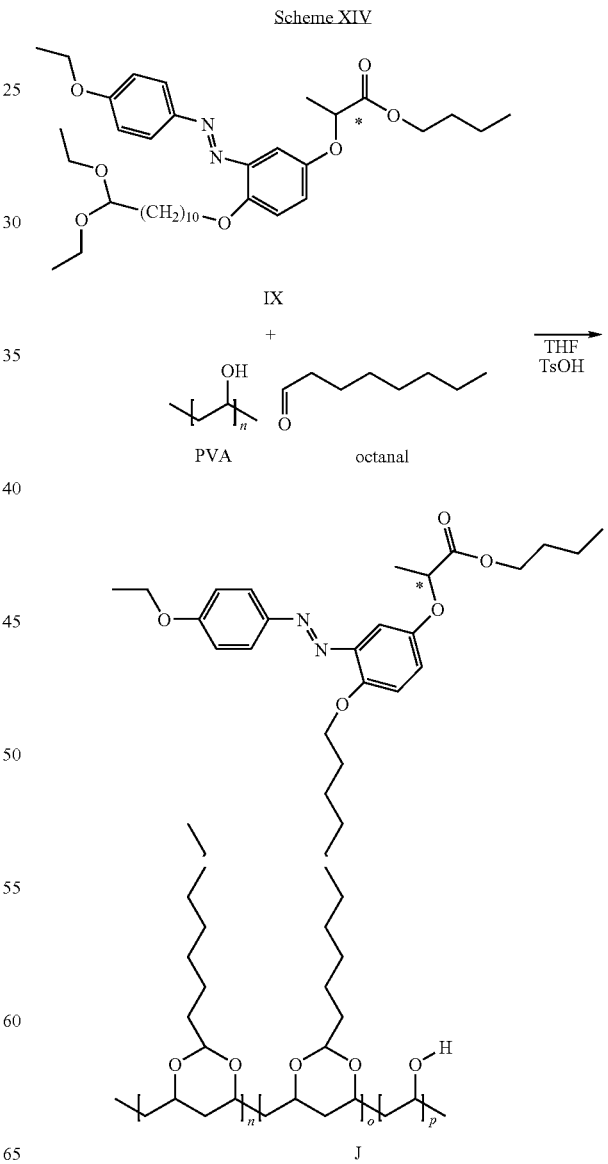

EXAMPLE 11

Functionalisation of PVA with 2-(11,11-diethoxy-undecyloxy)-4-methyl-benzoic acid 4'-butoxy-biphenyl-4-yl ester (side-chain precursor X) and octanal In a 100 ml flask, 0.53 g of side-chain precursor x, 0.065 g of octanal, 0.12 g of PVA ($M_w$ about 15 000), and 0.1 g of TsOH were dissolved in 25 ml of dry DMF and stirred at about 60° C. for 24 hours.

The reaction mixture was then poured into 250 ml of methanol and a polymer was precipitated. The precipitate was collected and dissolved in 5 ml of chloroform and reprecipitated in 100 ml of methanol. The re-precipitation was repeated twice.

The yield was 0.22 g of polymer. Losses were due to the presence of low molar mass polymer that was removed in the workup procedure.

$^1$H-NMR spectrum of the obtained polymer was in accordance with structure K of Scheme XV. The side-chain molar ratio X/octanal in the polymer as determined using NMR was found to be 1.7/1 (=o/n in structure K).

The side-chain formed from side-chain precursor X is attached to the polymeric backbone via spacing atoms in the form of —$(CH_2)_{10}$—

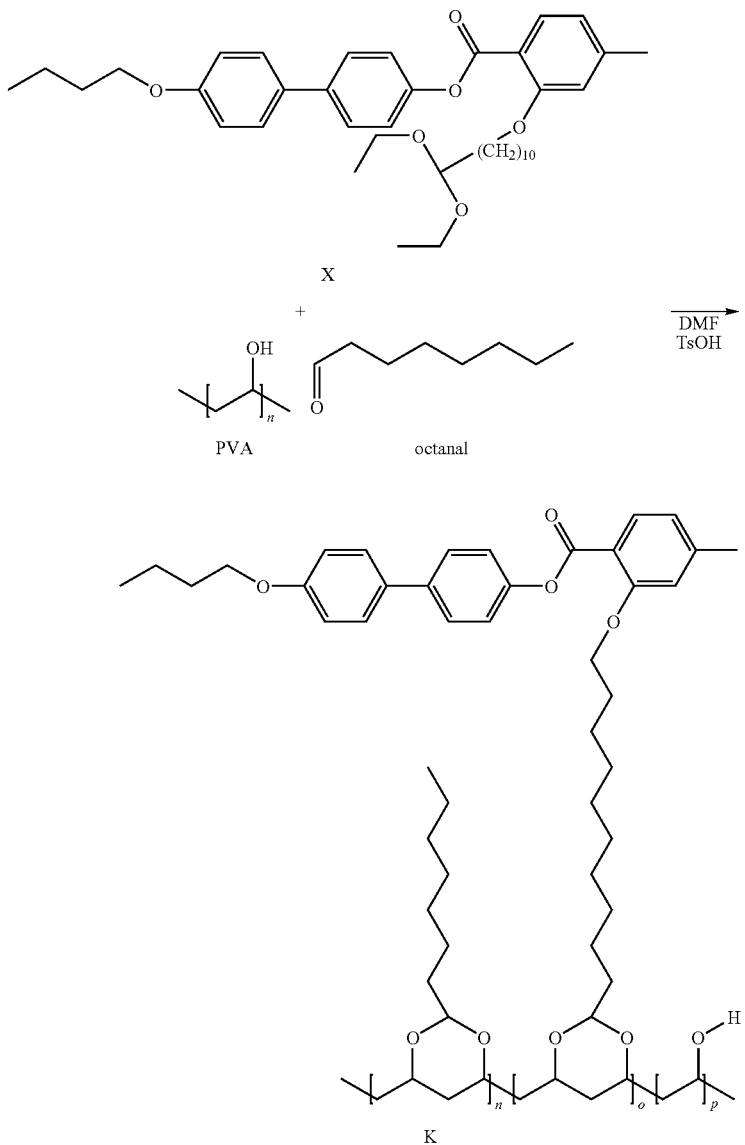

EXAMPLE 12

Functionalisation of PVA with 4-(11,11-diethoxy-undecyloxy)-2,3,5,6,2',3',5',6'-octafluoro-4'-hexyloxy-biphenyl (side-chain precursor XI) and octanal Polymer L is prepared, in accordance with the previous examples, by mixing and stirring (for instance, at about 60° C. for 24 hours) appropriate amounts of side-chain precursor XI, octanal, PVA, TsOH, and dry DMF in a flask.

The reaction mixture is then poured into an appropriate amount of an organic solvent, such as methanol, to precipitate the polymer which is in accordance with structure L of Scheme XVI.

Scheme XVI

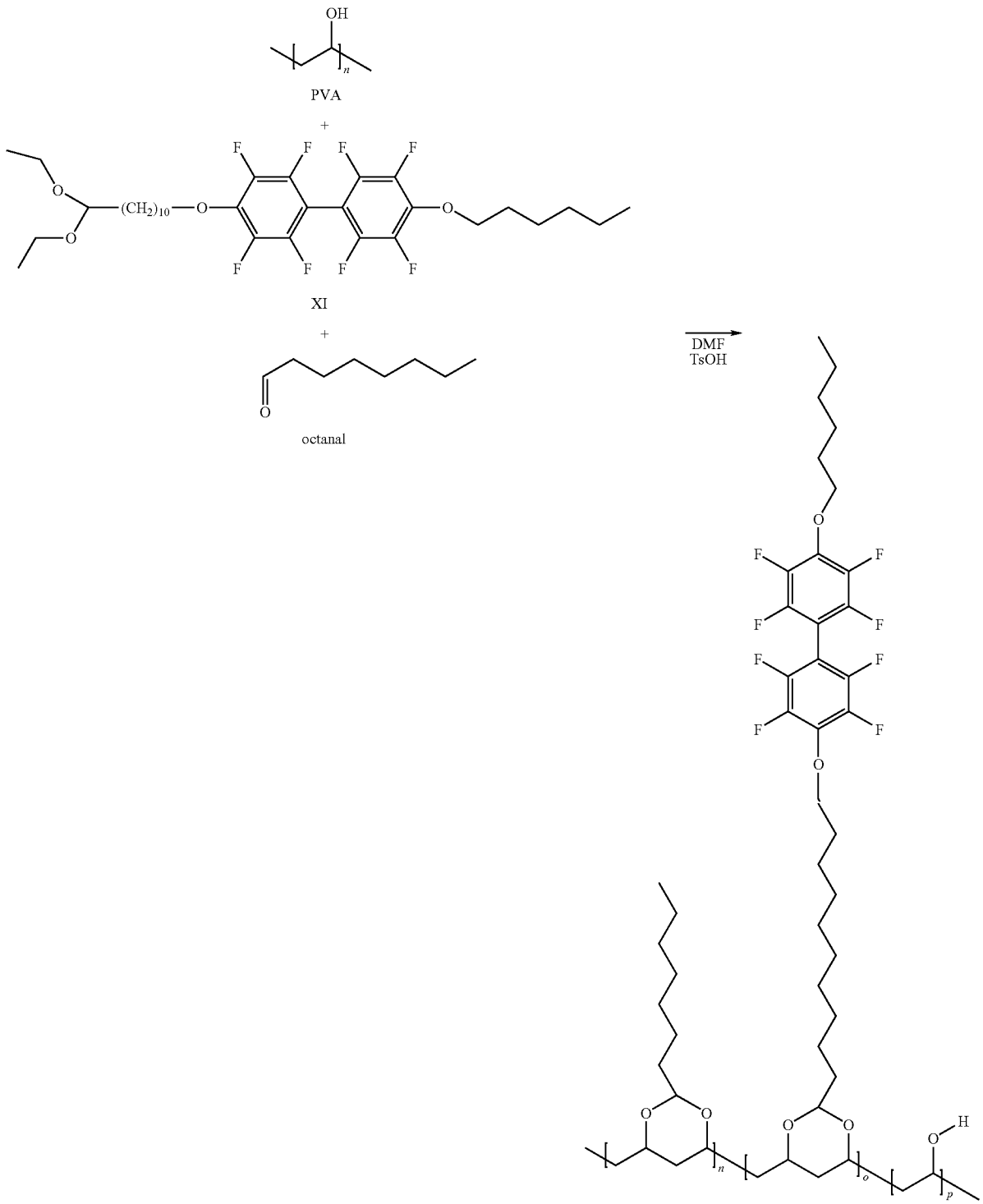

EXAMPLE 13

Functionalisation of PVA with 2-(11,11-diethoxy-undecyloxy)-4-methyl-benzoic acid 4'-butoxy-2,3,5,6,2',3',5',6'-octafluoro-biphenyl-4-yl ester (side-chain precursor XII) and octanal Polymer M is prepared, in accordance with the previous examples, by mixing and stirring (for instance, at about 60° C. for 24 hours) appropriate amounts of side-chain precursor XII, octanal, PVA, TsOH, and dry DMF in a flask.

The reaction mixture is then poured into an appropriate amount of an organic solvent, such as methanol, to precipitate the polymer which is in accordance with structure M of Scheme XVII.

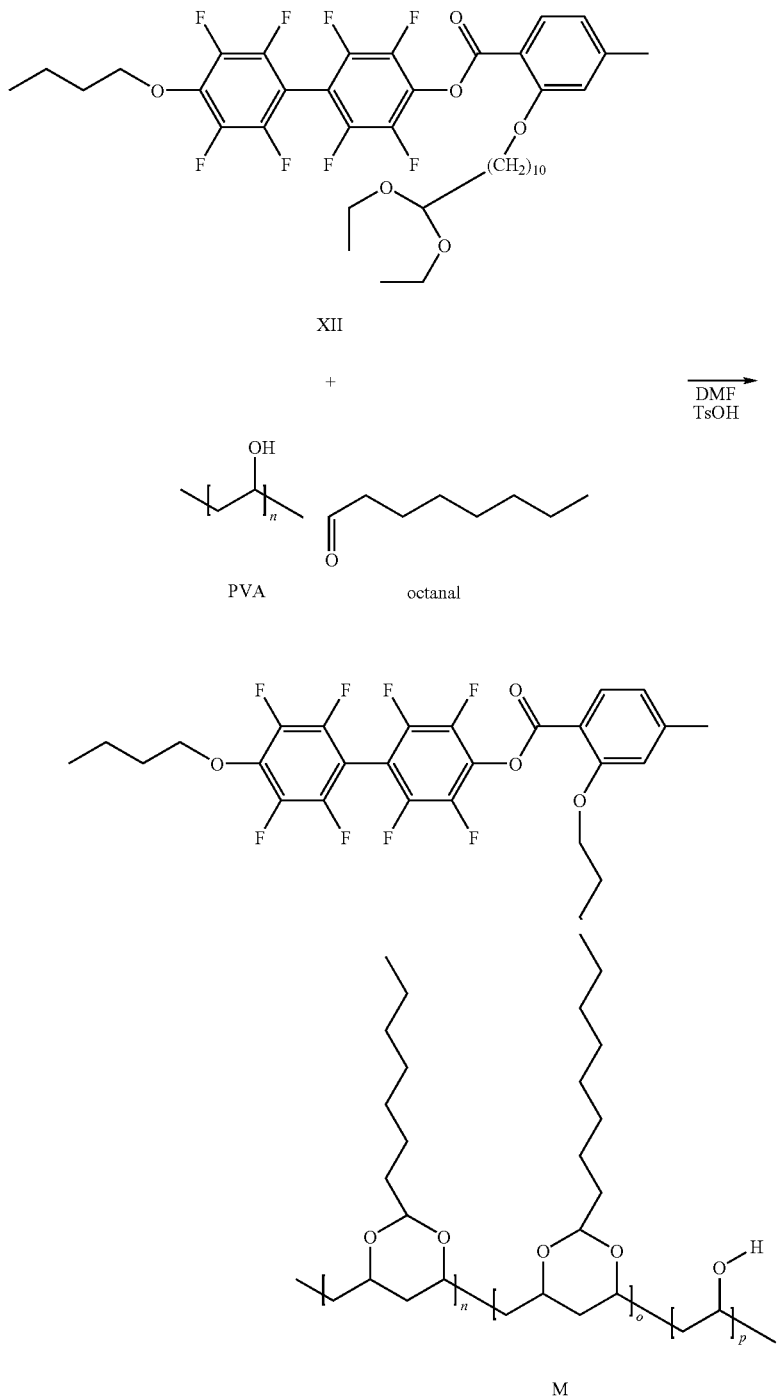

EXAMPLE 14

Functionalisation of PVA with 4'-(11,11-diethoxy-undecyloxy)-biphenyl-4-carboxylic acid ethyl ester (side-chain precursor II)

Polymer N is prepared, in accordance with the previous examples, by mixing and stirring (for instance, at about 60° C. for 24 hours) appropriate amounts of side-chain precursor II, PVA, TsOH, and dry DMF in a flask.

The reaction mixture is then poured into an appropriate amount of an organic solvent, such as methanol, to precipitate the polymer which is in accordance with structure N of Scheme XVIII.

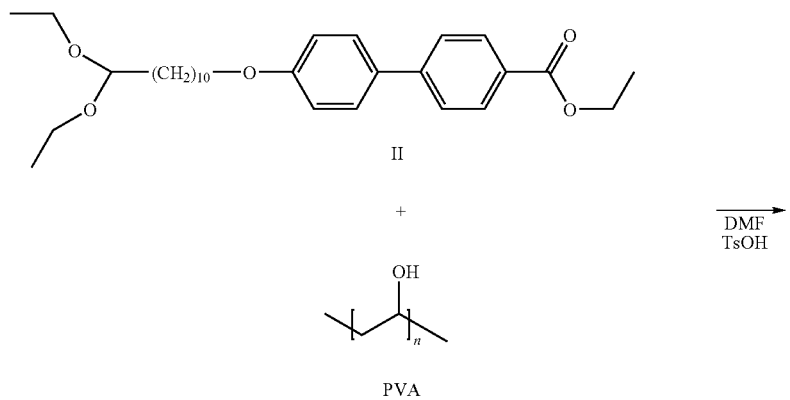

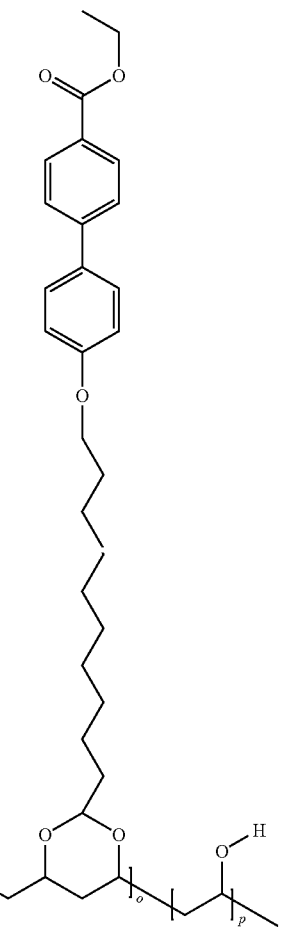

EXAMPLE 15

Functionalisation of PVA with 4'-(11,11-diethoxy-undecyloxy)-biphenyl-4-carboxylic acid 4-methoxy phenyl ester (side-chain precursor IV)

Polymer O is prepared, in accordance with the previous examples, by mixing and stirring (for instance, at about 60° C. for 24 hours) appropriate amounts of side-chain precursor IV, PVA, TsOH, and dry DMF in a flask.

The reaction mixture is then poured into an appropriate amount of an organic solvent, such as methanol, to precipitate the polymer which is in accordance with structure O of Scheme XIX.

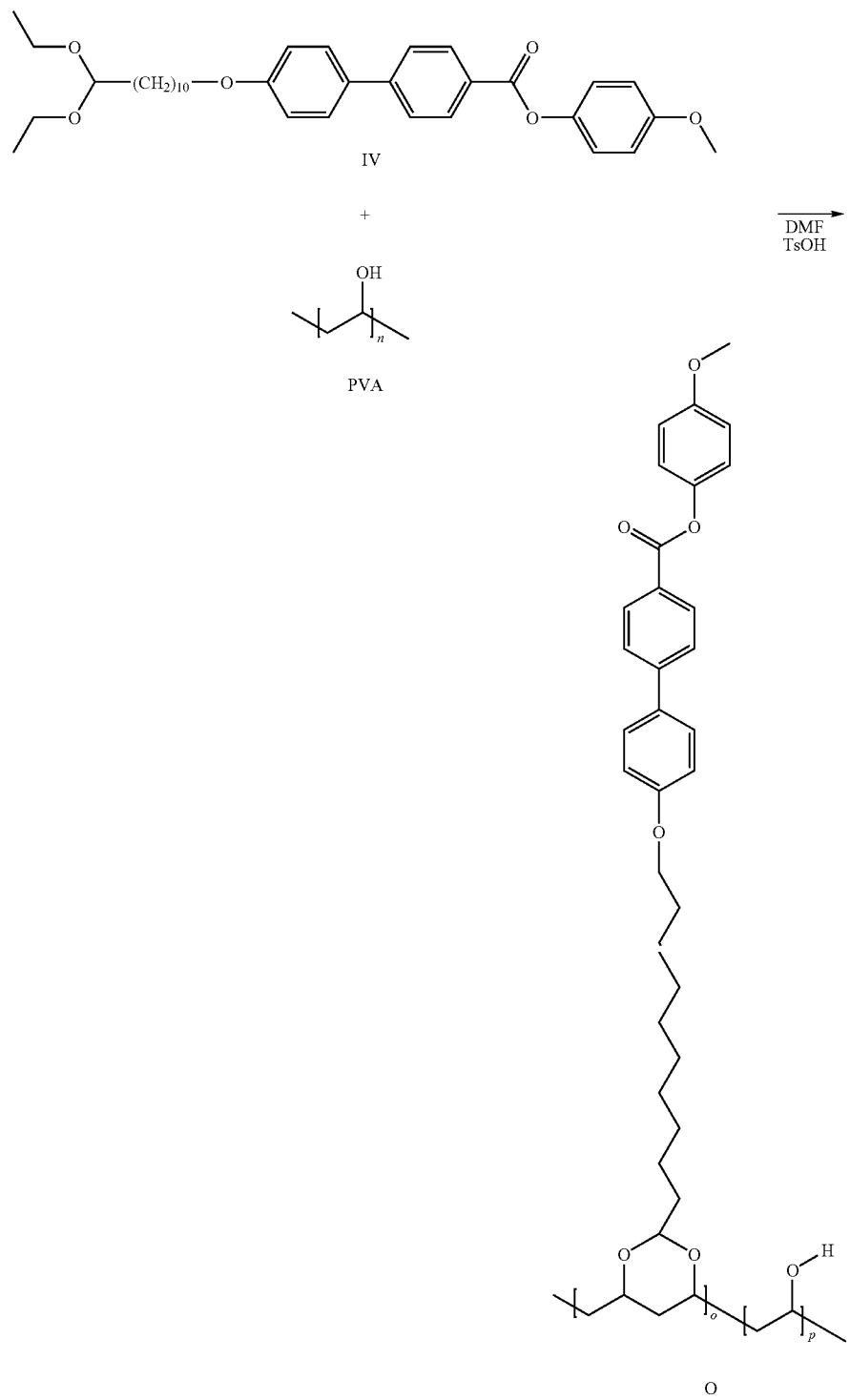

EXAMPLE 16

Functionalisation of PVA with 1,21-bis-(4'-carbethoxy-4-biphenyloxy)-10-diethoxymethyl-henicos-10-ene (side-chain precursor XIII)

Polymer P is prepared, in accordance with the ous examples, by mixing and stirring (for instance, at about 60° C. for 24 hours) appropriate amounts of sidechain precursor XIII, PVA, TsOH, and dry DMF in a flask.

The reaction mixture is then poured into an appropriate amount of an organic solvent, such as methanol, to precipitate the polymer which is in accordance with structure P of Scheme XX.

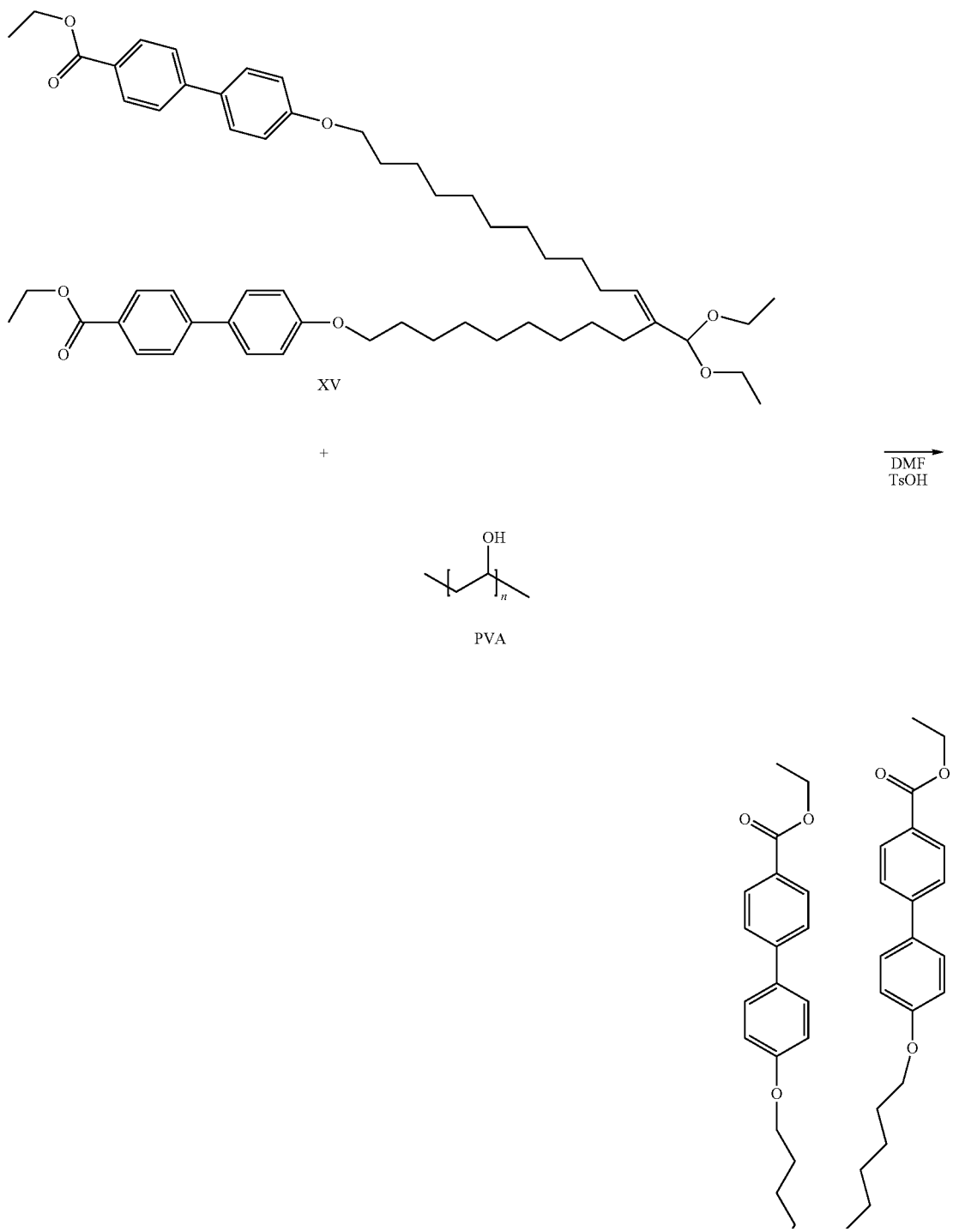

-continued

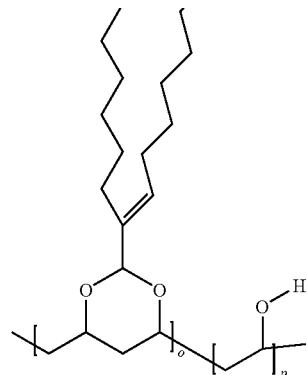

P

EXAMPLE 16

Functionalisation of PVA with 1,21-bis-(4'-carbethoxy-4-biphenyloxy)-10-diethoxymethyl-henicos-10-ene (side-chain precursor XIII) and octanal Polymer Q is prepared, in accordance with the previous examples, by mixing and stirring (for instance, at about 60° C. for 24 hours) appropriate amounts of side-chain precursor XIII, octanal, PVA, TsOH, and dry DMF in a flask.

The reaction mixture is then poured into an appropriate amount of an organic solvent, such as methanol, to precipitate the polymer which is in accordance with structure Q of Scheme XXI.

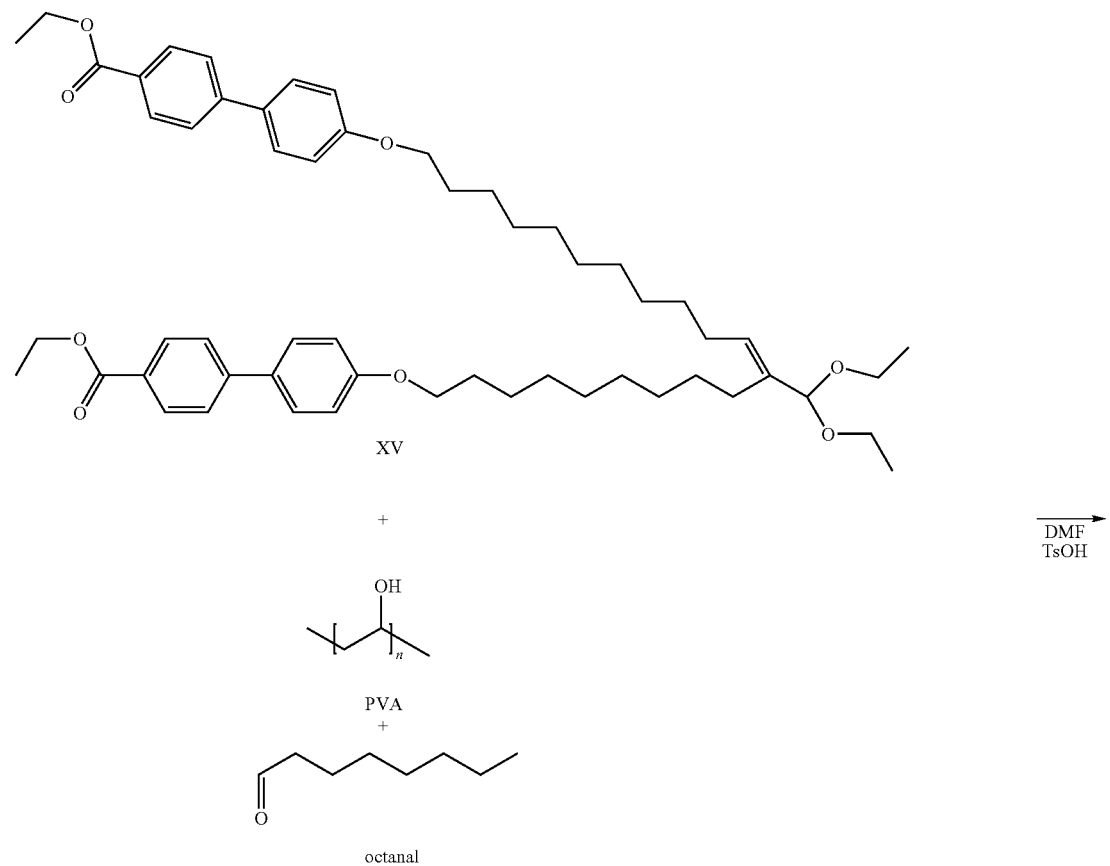

-continued

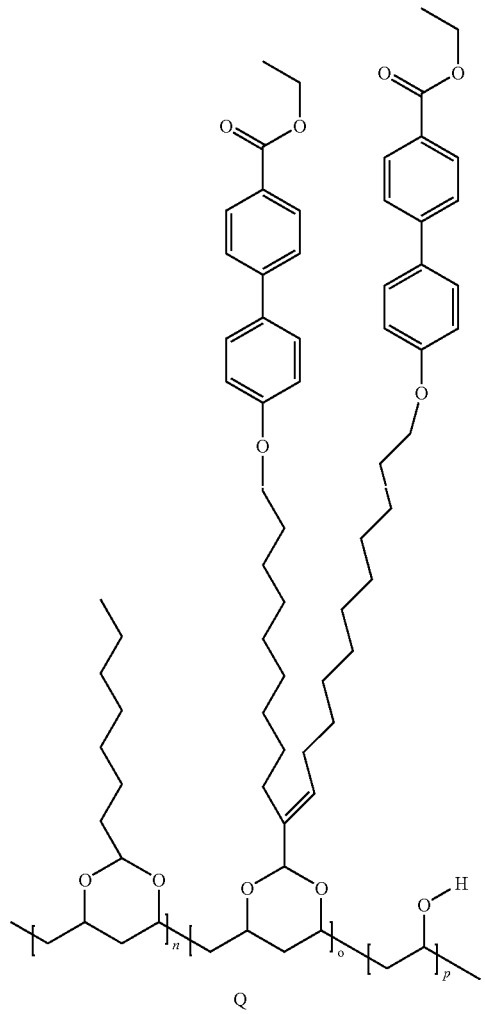

Q b) Examples of Methods for Manufacturing a Liquid Crystal Device According to the Invention A liquid crystal device may be prepared by a method comprising the steps of providing a surface-director alignment layer comprising a polymer according to the invention on a surface of at least one substrate, and then sandwiching a liquid crystal layer between two substrates, at least one of which is provided with said polymer, arranged so that said surface-director alignment layer(s) is (are) facing the liquid crystal layer.

The surface-director alignment layer is preferably provided by applying a solution comprising said polymer on said surface, and then removing said solvent from the surface. Thus, there is no need to cure a pre-polymer to form a layer of the polymer layer on the substrate surface.

A liquid crystal display glass substrates having a thickness of 1.10 mm was used. One side of the substrate was provided with an indium tin oxide (ITO) layer (electrode material) having a surface resistance of 80 Ω/cm², Addressing electrode structures were provided using a conventional photolithography process known to persons skilled in the art. The glass substrate was cut into pieces with a size of 9.5×12.5 mm and the edges were ground. Also glass substrates of the size 25.4×25.4 mm have been used.

The substrates were then washed several times in distilled water in an ultra-sonic bath, dried and then washed two times in isopropanol. The substrates were thereafter moved into a clean-room.

The ITO side of the substrates was spin coated with a surface-director alignment material dissolved in tetrahydrofuran (THF) to a concentration of about 0.1% (w/w) (concentrations up to 0.5% w/w have been tested). The speed was about 3000-4000 rpm and coating was performed for 30 seconds.

After coating, the substrates were heated for approximately 5-10 minutes at a temperature of 125° C. to remove the solvent (THF) and form an alignment layer. Drying can be performed in an oven or on a hot plate and/or under vacuum. The substrates were thereafter set to cool down.

It shall be noted that also two-step processes comprising heating for about 5-10 minutes at 60° C. followed by heating for about 10-30 minutes at 130° have been tested with acceptable results. However, it may be noted that temperatures over room temperature are in principle not necessary for the drying step.

The applied surface-director alignment layer, on top of the ITO, was then buffed with a nylon cloth using a drum diameter of 120 mm, a drum speed of 300 rpm, a linear speed of 15 mm/sec, and a pile contact length of about 0.5 mm. All substrates were buffed in the same direction.

Two substrates, one substrate being rotated 180° to make the buffing direction antiparallel in the cell, were thereafter put together to a cell using a UV-glue (Norland NOA68) and spacers in a string at two of the edges. An alternative is to spray spacers from an ethanol dispersion onto the cell surface. The cell was put under pressure in an UV-exposure box for 15 minutes.

Small electric cords were ultra-sonically soldered to each ITO-surface of the cell.

A nematic liquid crystal, in isotropic phase, was then introduced into the cell by means of capillary forces (this can be done with or without vacuum applied).

It shall be noted that the device described above is of a relatively simple type. Devices can be of much larger size and can be addressed in different ways, such as by using a passive matrix-addressed type or an active matrix-addressed type. In these cases, steps involving complex microelectronics productions steps are involved.

EXAMPLE 17

Out-of-Plane Switching Liquid Crystal Device Having an Electrically Stabilised Vertically Aligned Surface-Director Alignment Layer The ITO side of the substrates was coated, as described above, with polymer A prepared in Example 1. It shall be noted, however, that any one of the structures according to Formulas I to XXII may be used in this embodiment. The polymer layer (about 100 nm) was rubbed un-directionally very lightly to induce a small pre-tilt of the mesogenic side-groups of the polymer, and the cell was thereafter assembled.

The sandwich cell (cell gap about 3 μm) was then filled with the nematic mixture MBBA/MLC6608 (Merck, Germany), 40/60 wt %, MBBA exhibiting $\Delta\epsilon=-0.8$ and MLC 6608 exhibiting $\Delta\epsilon=-4.2$.

In this cell, the polymer layer acts as a surface-director alignment layer.

The alignment of the cell after cooling to room temperature was inspected by means of a polarising microscope and it was found to be uniform vertical.

The response rise and decay times were measured in a set-up comprising a polarising microscope, a photo-detector, an oscilloscope and a pulse-generator.

The electro-optic response of the cell with vertical alignment, under application of unipolar impulses with low frequency (about 1 Hz), is depicted in FIG. 1. At a voltage (U) of 9.2 V, the measured rise and decay time were about 1.9 and 3.8 ms, respectively. Thus, the measured decay time is about 5 times shorter than the decay time usually measured in out-of-plane switching liquid crystal cells with an initial vertical alignment.

EXAMPLE 18

Out-of-Plane Switching Liquid Crystal Device Having an Electrically Stabilised Vertically Aligned Surface-Director Alignment Layer Example 17 was repeated except that the sandwich cell was filled with the nematic mixture MBBA/MLC6884 (Merck, Germany), 40/60 wt %, MLC 6884 exhibiting $\Delta\epsilon=-5.0$ and MBBA exhibiting $\Delta\epsilon=-0.8$.

Figure 2:
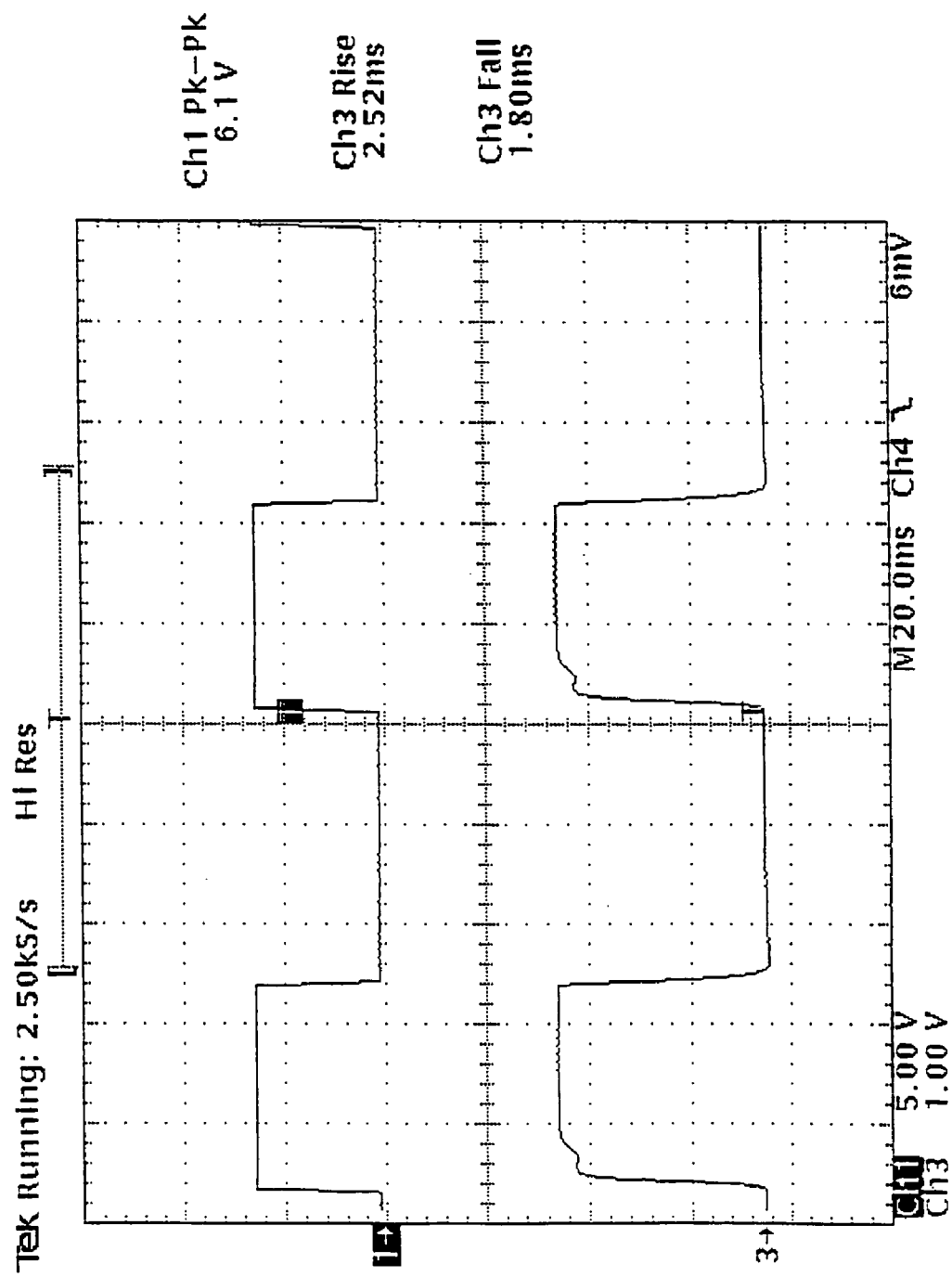
FIG. 2 shows the rise and decay times measured for a liquid crystal device comprising a surface-director alignment layer according to the invention and exhibiting an initial vertical alignment of the liquid crystal bulk layer (see Example 18).

At a voltage (U) of 6.1 V, the measured rise and decay time were about 2.5 and 1.8 ms, respectively, as shown in FIG. 2.

EXAMPLE 19

Out-of-Plane Switching Liquid Crystal Device Having an Electrically Stabilised Vertically Aligned Surface-Director Alignment Layer Example 17 was repeated except that the ITO side of the substrates was coated, as described above, with polymer H prepared in Example 8. The polymer layer was, however, not rubbed. Furthermore, the sandwich cell was filled with the nematic material MLC6884 (Merck, Germany) exhibiting $\Delta\epsilon=-5.0$.

Figure 3:
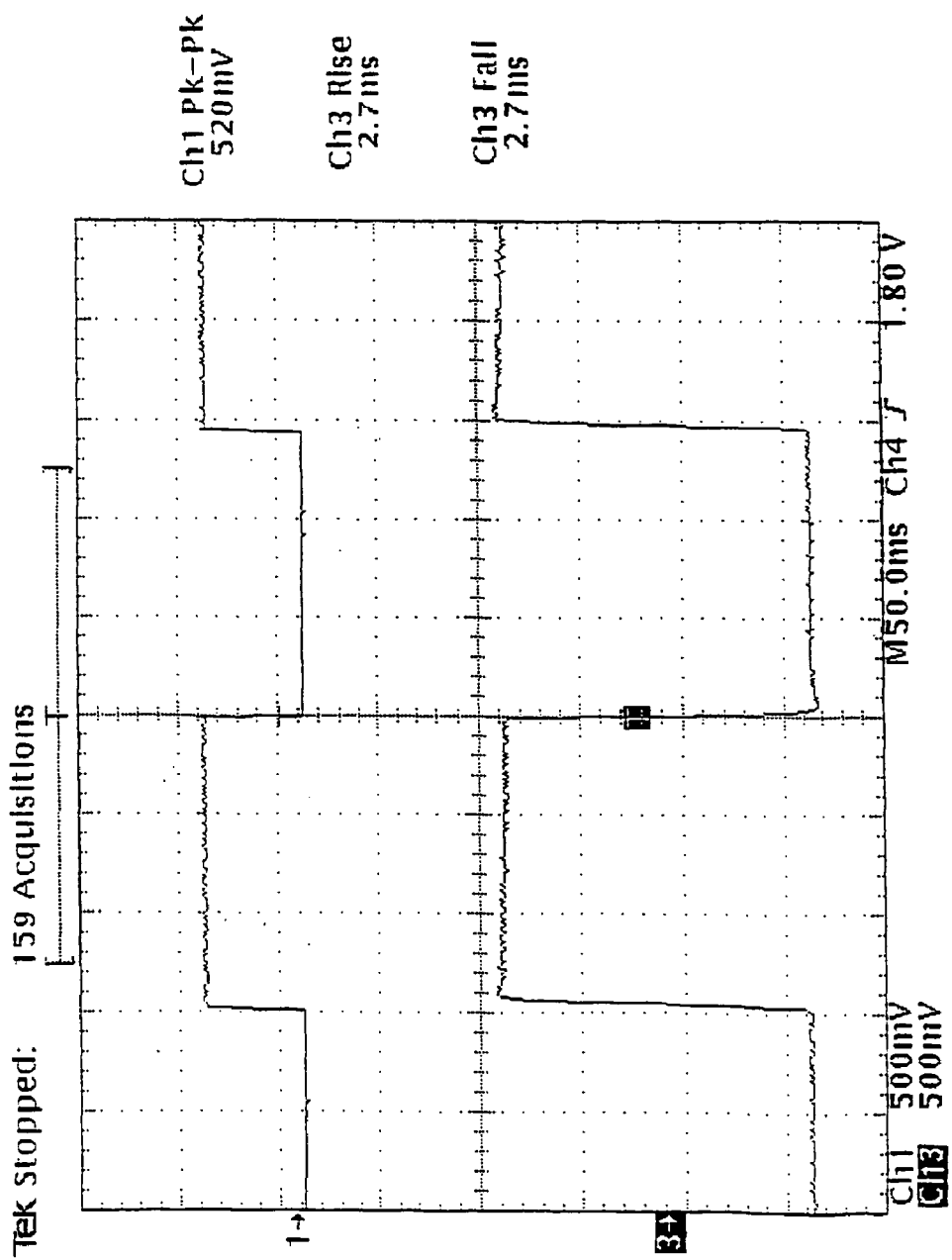
FIG. 3 shows the rise and decay times measured for a liquid crystal device comprising a surface-director alignment layer according to the invention and exhibiting an initial vertical alignment of the liquid crystal bulk layer (see Example 19).

At a voltage (U) of 5.2 V, the measured rise and decay time were about 2.7 and 2.7 ms, respectively, as shown in FIG. 3.

EXAMPLE 20

Out-of-Plane Switching Liquid Crystal Device Having an Electrically Stabilised Planar Aligned Surface-Director Alignment Layer The ITO side of the substrates was coated, as described above, with polymer J prepared in Example 10. It shall be noted, however, that any one of the structures according to Formulas XXIII to XXXIV may be used in this embodiment.

The polymer layer (about 100 nm) was rubbed unidirectionally to ensure uniform planar alignment of the mesogenic side-groups of the polymer, and the cell was thereafter assembled.

The sandwich cell (cell gap about 3 μm) was then filled with the nematic material E7 (BDH/Merck) exhibiting $\Delta\epsilon>0$.

In this cell, the polymer layer acts as a surface-director alignment layer.

The alignment of the cell after cooling to the room temperature was inspected by means of a polarising microscope and it was found to be uniform planar.

The rise and decay times were measured in a set-up comprising a polarising microscope, a photo-detector, an oscilloscope and a pulse-generator.

The electro-optic response of the cell with planar alignment, under application of unipolar impulses with low frequency (about 1 Hz), was found to be about 0.5 ms and 4 ms for rise and decay times, respectively.

EXAMPLE 21

Out-of-Plane Switching Liquid Crystal Device Having an Electrically Stabilised Planar Aligned Surface-Director Alignment Layer Example 20 was repeated except that the sandwich cell was filled with the nematic material E70 A (BDH/Merck) exhibiting $\Delta\epsilon=+10.8$.

Figure 4:
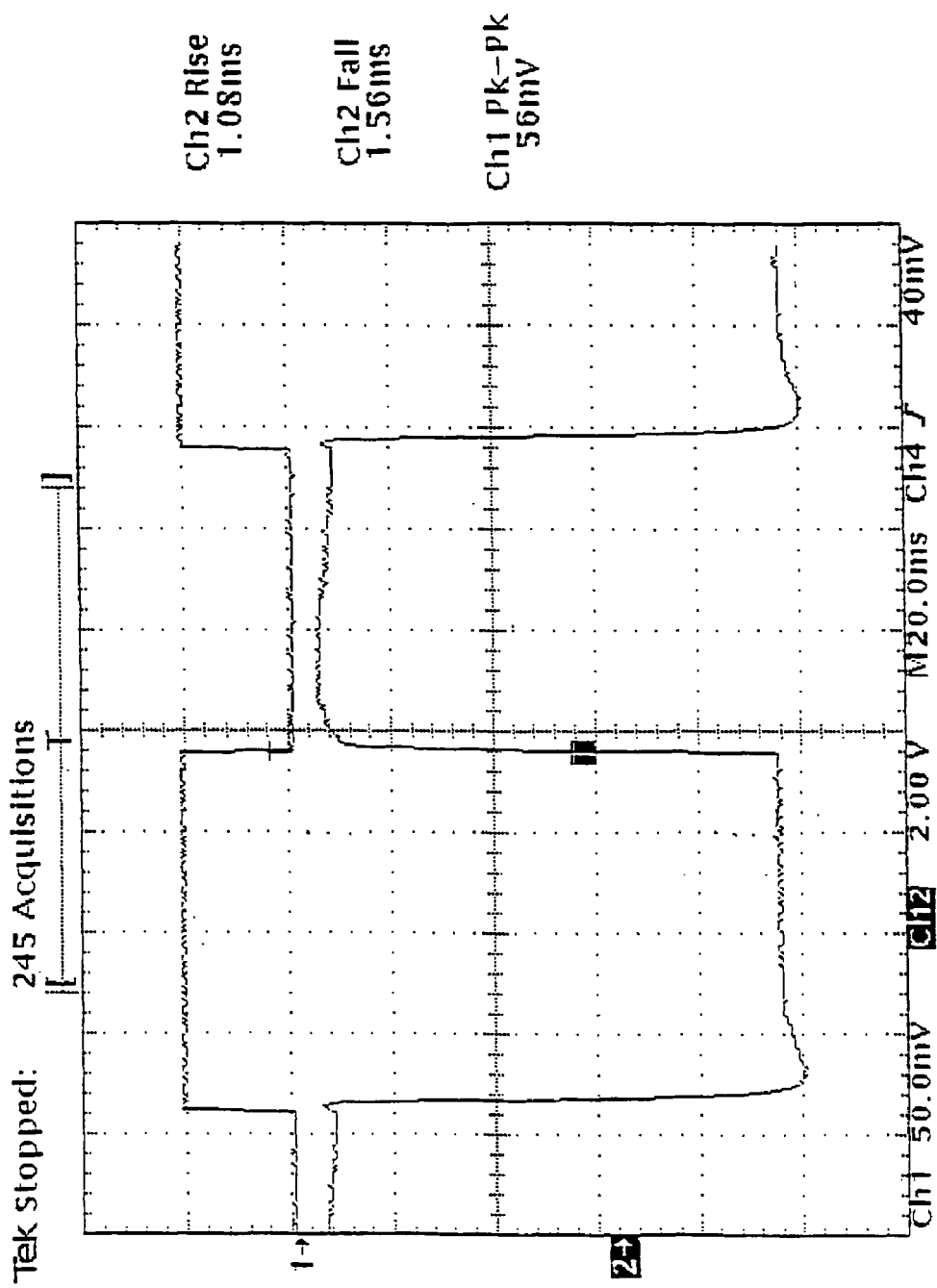
FIG. 4 shows the rise and decay times measured for a liquid crystal device comprising a surface-director alignment layer according to the invention and exhibiting an initial planar alignment of the liquid crystal bulk layer (see Example 21).

At a voltage (U) of 5.6 V, the measured rise and decay time were about 1.1 and 1.6 ms, respectively, as shown in FIG. 4.

While the invention has been described in detail and with reference to specific embodiments thereof, it will be apparent for one skilled in the art that various changes and modifications can be made therein without departing from the spirit and scope thereof.

The invention claimed is:

1. A polymer for use as a surface-director alignment layer in a liquid crystal device, said polymer comprising a polymeric backbone and side-chains attached thereto wherein, the polymeric backbone lacks directly coupled ring structures, and
each side-chain of at least some of the side-chains
(i) comprises at least two unsubstituted and/or substituted phenyls coupled via a coupling selected from the group consisting of a carbon-carbon single bond (—), a carbon-carbon double bond containing unit (—CH=CH—), a carbon-carbon triple bond containing unit (—C≡C—), a methylene ether unit (—CH₂O—), an ethylene ether unit (—CH₂CH₂O—), an ester unit (—COO—) and an azo unit (—N=N—),
(ii) exhibits a permanent and/or induced dipole moment that in ordered phase provides dielectric anisotropy, and
(iii) is attached to the polymeric backbone via at least two spacing atoms.

2. A polymer according to claim 1, wherein said side-chain is attached to the polymeric backbone via at least five spacing atoms.

3. A polymer according to claim 1, wherein the polymeric backbone comprises
a first type of randomly distributed units according to

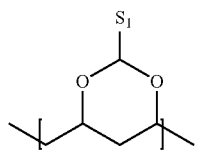

wherein S₁ represents a first side-chain comprising at least two unsubstituted and/or substituted phenyls coupled via a coupling selected from the group consisting of a carbon-carbon single bond (—), a carbon-carbon double bond containing unit (—CH=CH—), a carbon-carbon triple bond containing unit (—C≡C—), a methylene ether unit (—CH₂O—), an ethylene ether unit (—CH₂CH₂O—), an ester unit (—COO—) and an azo unit (—N=N—) and exhibiting a permanent and/or induced dipole moment that in ordered phase provides dielectric anisotropy, and at least two spacing atoms through which the first side-chain is attached to the polymeric backbone, and
a second type of randomly distributed units according to

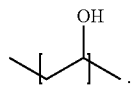

4. A polymer according to claim 3, wherein the polymeric backbone comprises a third type of randomly distributed units according to

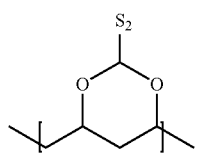

wherein S₂ represents a second side-chain, being different from S₁, comprising at least two unsubstituted and/or substituted phenyls coupled via a coupling selected from the group consisting of a carbon-carbon single bond (—), a carbon-carbon double bond containing unit (—CH=CH—), a carbon-carbon triple bond containing unit (—C≡C—), a methylene ether unit (—CH₂O—), an ethylene ether unit (—CH₂CH₂O—), an ester unit (—COO—) and an azo unit (—N=N—) and exhibiting a permanent and/or induced dipole moment that in ordered phase provides dielectric anisotropy, and at least two spacing atoms through which the second side-chain is attached to the polymeric backbone.

5. A polymer according to claim 3, wherein the polymeric backbone comprises a further type of randomly distributed units according to

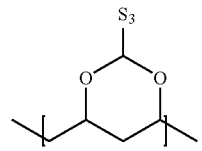

wherein S₃ represents a side-chain, being different from S₁ and S₂, exhibiting no permanent and/or induced dipole moment and thus providing no dielectric anisotropy.

6. A method for preparation of a polymer according to claim 1, comprising reacting a side-chain precursor with a polymeric backbone lacking directly coupled ring structures, wherein said side-chain precursor comprises at least two unsubstituted and/or substituted phenyls coupled via a coupling selected from the group consisting of a carbon-carbon single bond (—), a carbon-carbon double bond containing unit (—CH=CH—), a carbon-carbon triple bond containing unit (—C≡C—), a methylene ether unit (—CH₂O—), an ethylene ether unit (—CH₂CH₂O—), an ester unit (—COO—) and an azo unit (—N=N—), and exhibits a permanent and/or induced dipole moment that in ordered phase provides dielectric anisotropy.

7. A method according to claim 6, wherein the polymeric backbone is a polyvinyl alcohol.

8. A method for preparation of a polymer according to claim 1, comprising polymerising monomers having side-chains into a polymeric backbone lacking directly coupled ring structures, wherein each side-chain of at least some of the side-chains comprises at least two unsubstituted and/or substituted phenyls coupled via a coupling selected from the group consisting of a carbon-carbon single bond (—), a carbon-carbon double bond containing unit (—CH=CH—), a carbon-carbon triple bond containing unit (—C≡C—), a methylene ether unit (—CH₂O—), an ethylene ether unit (—CH₂CH₂O—), an ester unit (—COO—) and an azo unit (—N=N—), and exhibits a permanent and/or induced dipole moment that in ordered phase provides dielectric anisotropy.

9. A composition for use as a surface-director alignment layer in a liquid crystal device comprising at least one polymer according to claim 1 and a second polymer.

10. A composition according to claim 9, wherein the second polymer is a polyvinyl acetal.

11. A composition according to claim 9, wherein the second polymer is a polymer according to claim 1.

12. A surface-director alignment layer for use in a liquid crystal device comprising at least one polymer according to claim 1.

13. A process for alignment in a liquid crystal device comprising utilizing as a surface-director alignment layer a polymer according to claim 1.

14. A method for manufacturing a liquid crystal device comprising:
providing a surface-director alignment layer comprising a polymer according to claim 1 on a surface of at least one substrate, and
sandwiching a liquid crystal layer between two substrates, at least one of which is provided with said polymer, arranged so that said surface-director alignment layer(s) is (are) facing the liquid crystal layer.

15. A method according to claim 14, wherein said surface-director alignment layer is provided by applying a solution comprising said polymer and a solvent on said surface, and then removing said solvent from the surface.

16. A polymer according to claim 2, wherein the polymeric backbone comprises
a first type of randomly distributed units according to

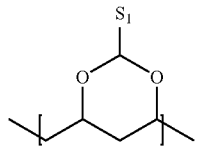

wherein $S_1$ represents a first side-chain comprising at least two unsubstituted and/or substituted phenyls coupled via a coupling selected from the group consisting of a carbon-carbon single bond (–), a carbon-carbon double bond containing unit (—CH=CH—), a carbon-carbon triple bond containing unit (—C≡C—), a methylene ether unit (—CH$_2$O—), an ethylene ether unit (—CH$_2$CH$_2$O—), an ester unit (—COO—) and an azo unit (—N=N—) and exhibiting a permanent and/or induced dipole moment that in ordered phase provides dielectric anisotropy, and at least two spacing atoms through which the first side-chain is attached to the polymeric backbone, and
a second type of randomly distributed units according to

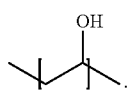

17. A method for preparation of a polymer according to claim 3, comprising polymerising monomers having side-chains into a polymeric backbone lacking directly coupled ring structures, wherein each side-chain of at least some of the side-chains comprises at least two unsubstituted and/or substituted phenyls coupled via a coupling selected from the group consisting of a carbon-carbon single bond (—), a carbon-carbon double bond containing unit (—CH=CH—), a carbon-carbon triple bond containing unit (—C≡C—), a methylene ether unit (—CH$_2$O—), an ethylene ether unit (—CH$_2$CH$_2$O—), an ester unit (—COO—) and an azo unit (—N=N—), and exhibits a permanent and/or induced dipole moment that in ordered phase provides dielectric anisotropy.

18. A composition for use as a surface-director alignment layer in a liquid crystal device comprising at least one polymer according to claim 3 and a second polymer.

19. A composition for use as a surface-director alignment layer in a liquid crystal device comprising at least one polymer for use as a surface-director alignment layer in a liquid crystal device, said polymer comprising a polymeric backbone and side-chains attached thereto wherein, the polymeric backbone lacks directly coupled ring structures, and each side-chain of at least some of the side-chains (i) comprises at least two unsubstituted and/or substituted phenyls coupled via a coupling selected from the group consisting of a carbon-carbon single bond (–), a carbon-carbon double bond containing unit (—CH=CH—), a carbon-carbon triple bond containing unit (—C≡C—), a methylene ether unit (—CH$_2$O—), an ethylene ether unit (—CH$_2$CH$_2$O—), an ester unit (—COO—) and an azo unit (—N=N—), (ii) exhibits a permanent and/or induced dipole moment that in ordered phase provides dielectric anisotropy, and (iii) is attached to the polymeric backbone via at least two spacing atoms, wherein the second polymer is a polymer according to claim 3.

20. A surface-director alignment layer for use in a liquid crystal device comprising at least one polymer according to claim 3.

21. A process for alignment in a liquid crystal device comprising utilizing as a surface-director alignment layer a polymer according to claim 3.

22. A method for manufacturing a liquid crystal device comprising:
providing a surface-director alignment layer comprising a polymer according to claim 3 on a surface of at least one substrate, and
sandwiching a liquid crystal layer between two substrates, at least one of which is provided with said polymer, arranged so that said surface-director alignment layer(s) is (are) facing the liquid crystal layer.

23. A polymer according to claim 4, wherein the polymeric backbone comprises a further type of randomly distributed units according to

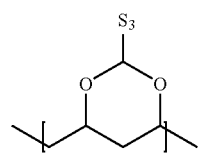

wherein $S_3$ represents a side-chain, being different from $S_1$ and $S_2$, exhibiting no permanent and/or induced dipole moment and thus providing no dielectric anisotropy.

24. A method for preparation of a polymer according to claim 3, comprising reacting a side-chain precursor with a polymeric backbone lacking directly coupled ring structures, wherein said side-chain precursor comprises at least two unsubstituted and/or substituted phenyls coupled via a coupling selected from the group consisting of a carbon-carbon single bond (–), a carbon-carbon double bond containing unit (—CH=CH—), a carbon-carbon triple bond containing unit (—C≡C—), a methylene ether unit (—CH$_2$O—), an ethylene ether unit (—CH$_2$CH$_2$O—), an ester unit (—COO—) and an azo unit (—N=N—), and exhibits a permanent and/or induced dipole moment that in ordered phase provides dielectric anisotropy.

* * * * *

UNITED STATES PATENT AND TRADEMARK OFFICE
CERTIFICATE OF CORRECTION

| | |
|---|---|
| PATENT NO. | : 7,575,788 B2 |
| APPLICATION NO. | : 10/562118 |
| DATED | : August 18, 2009 |
| INVENTOR(S) | : Lachezar Komitov and Bertil Helgee |

Page 1 of 1

It is certified that error appears in the above-identified patent and that said Letters Patent is hereby corrected as shown below:

On the Title Page add:

Item (30)   Foreign Application Priority Data

Jun. 23, 2003 (SE).............0301810-8
    Nov. 18, 2003 (SE).............0303041-8

Signed and Sealed this

Twenty-third Day of February, 2010

David J. Kappos
*Director of the United States Patent and Trademark Office*

UNITED STATES PATENT AND TRADEMARK OFFICE
CERTIFICATE OF CORRECTION

PATENT NO.      : 7,575,788 B2                                    Page 1 of 1
APPLICATION NO. : 10/562118
DATED           : August 18, 2009
INVENTOR(S)     : Komitov et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 733 days.

Signed and Sealed this

Fourteenth Day of December, 2010

David J. Kappos
*Director of the United States Patent and Trademark Office*